US012680254B2

(12) United States Patent
Ebihara et al.

(10) Patent No.: US 12,680,254 B2
(45) Date of Patent: Jul. 14, 2026

(54) PILING MACHINE

(71) Applicant: JDC Corporation, Tokyo (JP)

(72) Inventors: Akimitsu Ebihara, Tokyo (JP); Masakazu Sekiguchi, Tokyo (JP); Hidetoshi Morimoto, Tokyo (JP); Hiroshi Obata, Tokyo (JP)

(73) Assignee: JDC Corporation, Tokyo (JP)

( * ) Notice: Subject to any disclaimer, the term of this patent is extended or adjusted under 35 U.S.C. 154(b) by 34 days.

(21) Appl. No.: 18/850,963

(22) PCT Filed: Feb. 16, 2023

(86) PCT No.: PCT/JP2023/005431
§ 371 (c)(1),
(2) Date: Sep. 25, 2024

(87) PCT Pub. No.: WO2024/029110
PCT Pub. Date: Feb. 8, 2024

(65) Prior Publication Data

US 2025/0223773 A1 Jul. 10, 2025

(30) Foreign Application Priority Data

Aug. 4, 2022 (JP) ................................ 2022-124530

(51) Int. Cl.
*E02D 7/18* (2006.01)
*E02D 7/16* (2006.01)
*E02D 13/06* (2006.01)
*B66C 1/02* (2006.01)
(Continued)

(52) U.S. Cl.
CPC ............... *E02D 7/16* (2013.01); *E02D 13/06* (2013.01); *B66C 1/02* (2013.01); *B66C 1/06* (2013.01); *B66C 1/44* (2013.01)

(58) Field of Classification Search
CPC E02D 7/16; E02D 13/06; E02D 11/00; E02D 7/18; B66C 1/02; B66C 1/06; B66C 1/44
See application file for complete search history.

(56) References Cited

U.S. PATENT DOCUMENTS 3,100,382 A * 8/1963 Muller .................... E02D 13/10 294/102.1
3,380,541 A * 4/1968 Bodine, Jr. ............... E02D 7/18 405/232
(Continued)

FOREIGN PATENT DOCUMENTS

JP H08-013488 A 1/1996
JP 2004-190382 A 7/2004
(Continued)

*Primary Examiner* — Edwin J Toledo-Duran
(74) *Attorney, Agent, or Firm* — Young Basile Hanlon & MacFarlane, P.C.

(57) ABSTRACT

A piling machine includes a main body unit including a traveling device, a pile driver that performs piling, and a moving device that is connected to the main body unit and moves the pile driver. A control device performs piling while the traveling device is traveling (e.g., while the main body unit is moving). This reduces the number of times the traveling device stops, and thus, the number of times of acceleration and deceleration can also be reduced. In this way, energy efficiency can be improved.

20 Claims, 17 Drawing Sheets

(51) Int. Cl.
*B66C 1/06* (2006.01)
*B66C 1/44* (2006.01)

(56) References Cited

U.S. PATENT DOCUMENTS

| | | | | | |
|---|---|---|---|---|---|
| 3,576,218 | A * | 4/1971 | Lisenby | E02D 7/26 | 173/28 |
| 3,597,929 | A * | 8/1971 | Bodine | E21B 7/24 | 173/52 |
| 3,696,625 | A * | 10/1972 | Alexander | E21B 7/021 | 173/27 |
| 3,700,047 | A * | 10/1972 | Gartner | E04H 17/263 | 173/124 |
| 3,703,934 | A * | 11/1972 | Cartner | E04H 17/263 | 173/193 |
| 3,722,600 | A * | 3/1973 | Hirata | E02D 7/18 | 175/49 |
| 3,850,317 | A * | 11/1974 | Lumier | B65G 47/90 | 414/281 |
| 3,866,425 | A * | 2/1975 | Morrice | E02D 5/16 | 180/8.5 |
| 4,050,526 | A * | 9/1977 | Deike | E21B 7/028 | 173/147 |
| 4,130,168 | A * | 12/1978 | Deike | E21B 7/028 | 173/141 |
| 4,143,719 | A * | 3/1979 | Furukawa | E02D 7/18 | 173/101 |
| 4,195,698 | A * | 4/1980 | Nakagawasai | E02D 7/26 | 173/147 |
| 4,257,488 | A * | 3/1981 | Schnell | E02D 13/04 | 173/133 |
| 4,371,041 | A * | 2/1983 | Becker | E21B 7/027 | 173/147 |
| 4,697,959 | A * | 10/1987 | Kinnan | E04H 12/2292 | 52/514 |
| 5,012,873 | A * | 5/1991 | Kennedy | E01F 9/619 | 173/53 |
| 5,076,372 | A * | 12/1991 | Hellbusch | E21B 49/02 | 175/49 |
| 5,192,168 | A * | 3/1993 | Massarsch | E02D 3/054 | 405/259.1 |
| 5,540,295 | A * | 7/1996 | Serrette | E21B 1/02 | 74/61 |
| 5,549,168 | A * | 8/1996 | Sadler | E02D 7/18 | 173/129 |
| 2003/0217420 | A1 * | 11/2003 | Snead | E01D 22/00 | 14/77.1 |
| 2011/0164928 | A1 * | 7/2011 | Homsi | E02D 7/16 | 405/232 |
| 2016/0090707 | A1 * | 3/2016 | Korherr | E02D 13/00 | 405/232 |
| 2016/0108598 | A1 * | 4/2016 | Waxse | E02D 7/06 | 702/33 |
| 2017/0306644 | A1 * | 10/2017 | Hoffman | E04H 17/263 | |
| 2019/0234037 | A1 * | 8/2019 | Canteri | E02D 7/06 | |
| 2020/0199833 | A1 * | 6/2020 | Strømsvåg | E01F 9/70 | |
| 2021/0047009 | A1 * | 2/2021 | Roodenburg | E02D 13/04 | |
| 2022/0042269 | A1 * | 2/2022 | Ono | E02D 13/06 | |

FOREIGN PATENT DOCUMENTS

| | | | |
|---|---|---|---|
| JP | 2014-148829 | A | 8/2014 |
| WO | 2022/097315 | A1 | 5/2022 |

* cited by examiner

FIG. 11

| | EXAMPLE 1 | EXAMPLE 2 | EXAMPLE 3 |
|---|---|---|---|
| PILE INTERVAL D(m) | 2m | | |
| PILE DRIVING SPEED OF PILE DRIVER Vp(m/min) | 2m/min | | |
| PILE LENGTH | 2m | 2.5m | 3m |
| PILE DRIVING LENGTH L(m) | 0.5m | 1.0m | 1.5m |
| Tp(min) | 0.25min | 0.5min | 0.75min |
| Tb(min) | 0.125min | 0.25min | 0.375min |
| Tw(min) | 0.25min | 0.25min | 0.25min |
| T(min) | 0.625min | 1min | 1.375min |
| Vv(m/min) | 3.2m/min | 2.0m/min | 1.5m/min |
| Vm(m/min) | −3.2m/min | −2.0m/min | −1.5m/min |

FIG. 13

| | EXAMPLE 1 | EXAMPLE 2 | EXAMPLE 3 |
|---|---|---|---|
| PILE INTERVAL D(m) | 2m | | |
| PILE DRIVING SPEED OF PILE DRIVER Vp(m/min) | 8m/min | | |
| PILE LENGTH | 4m | 5m | 6m |
| PILE DRIVING LENGTH L(m) | 3m | 4m | 5m |
| Tp(min) | 0.375min | 0.5min | 0.625min |
| Tb(min) | 0.1875min | 0.25min | 0.3125min |
| Tw(min) | 0.25min | 0.25min | 0.25min |
| T(min) | 0.8125min | 1min | 1.1875min |
| Vv(m/min) | 2.5m/min | 2.0m/min | 1.7m/min |
| Vm(m/min) | −2.5m/min | −2.0m/min | −1.7m/min |

PILING MACHINE

TECHNICAL FIELD

The present invention relates to a piling machine.

BACKGROUND

For example, in a case where a mega-solar power generation facility is installed, in a case where soil is retained on land, in a case where foundation construction for a fence is conducted, or the like, construction where a pile is directly pushed (driven) into the earth may sometimes be performed.

When a large number of piles are driven into the earth, a heavy machine such as a crane vehicle provided with a pile driver is used in some cases. When a large number of piles are driven using such a heavy machine, it is necessary for the heavy machine to repeatedly move and stop in such a manner that the heavy machine is moved to a vicinity of a place where a pile is driven, a piling work is performed in a stopped state, the heavy machine is moved to a vicinity of a next place where a pile is driven after the completion of the piling work, a piling work is performed in a stopped state, and so forth (e.g., refer to JP Patent Publication No. JP 2004-190382 A or the like).

SUMMARY

However, when the heavy machine repeatedly moves and stops, because the heavy machine accelerates and decelerates frequently, fuel, electric power, and the like are easily consumed, and energy efficiency is poor.

Thus, an object of the present invention is to provide a piling machine with high energy efficiency.

A piling machine according to teachings of this disclosure includes a main body unit including a traveling device, a pile driver that performs piling, a moving device that is connected to the main body unit and moves the pile driver, and a control device that performs the piling while the traveling device is traveling.

According to the teachings herein, energy efficiency of a piling machine can be improved.

BRIEF DESCRIPTION OF THE DRAWINGS

FIG. 11 is a diagram illustrating example settings of moving speeds Vv and Vm in the first embodiment.

FIG. 13 is a diagram illustrating example settings of moving speeds Vv and Vm in the second embodiment.

DETAILED DESCRIPTION

First Embodiment

Hereinafter, a first embodiment will be described in detail with reference to the accompanying drawings. Note that the present invention is not limited to the embodiments described below.

Figure 1A:
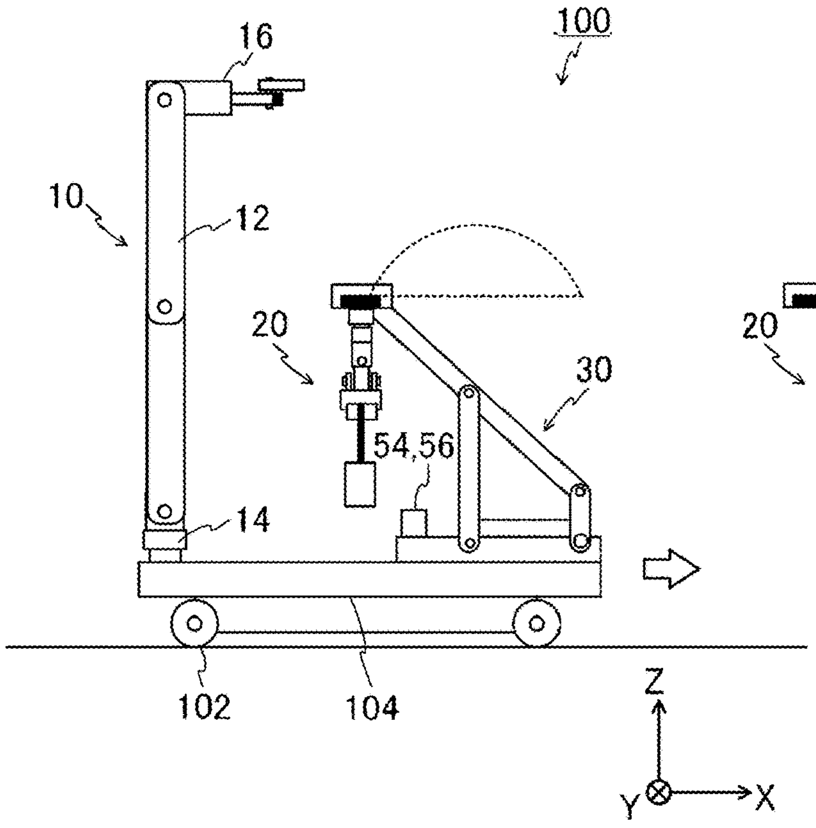
FIGS. 1A, 1B, and 1C are schematic diagrams illustrating a piling machine according to a first embodiment.
Figure 1B:
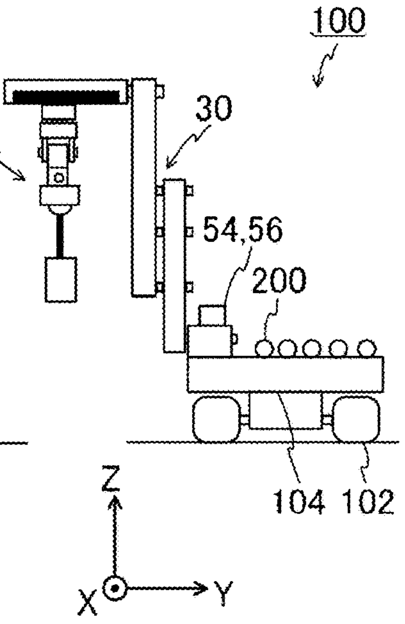
Figure 1C:
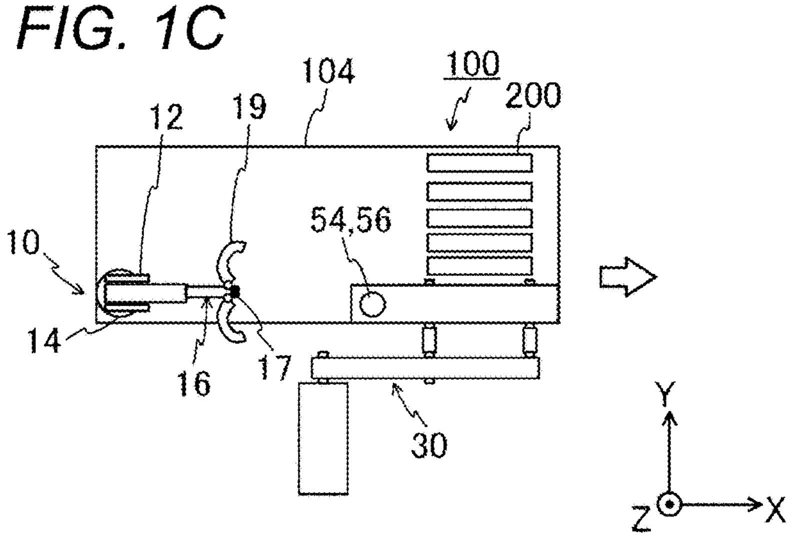

FIGS. 1A, 1B, and 1C are schematic diagrams illustrating a piling machine 100 according to the first embodiment. Note that, in the present embodiment, a direction in which the piling machine 100 travels straight when performing piling will be described as an X-axis direction, a perpendicular direction will be described as a Z-axis direction, and a direction orthogonal to each of the X-axis and the Z-axis will be described as a Y-axis direction. FIG. 1A is a diagram illustrating a state of the piling machine 100 when viewed from a −Y direction. FIG. 1B is a diagram illustrating a state of the piling machine 100 when viewed from a +X direction. FIG. 1C is a diagram illustrating a state of the piling machine 100 when viewed from a +Z direction.

As illustrated in FIGS. 1A, 1B, and 1C, the piling machine 100 includes a main body unit 104, a robot arm 10 as a first supply device provided on the main body unit 104, a pile driver 20 that executes piling, and a moving device 30 that moves the pile driver 20 with respect to the main body unit 104. Note that, in FIG. 1B, illustration of the robot arm 10 is omitted for convenience of illustration. The piling machine 100 of the present embodiment is of an autonomous driving type without a driver's seat.

The main body unit 104 moves on the ground with a traveling device 102 having four wheels (tires). The traveling device 102 rotates the wheels by being given a driving force from a drive source 106 (refer to FIG. 4). Note that the drive source 106 is assumed as, for example, an engine (e.g., an internal combustion engine). However, the drive source 106 is not limited thereto and may be constituted by a battery and a motor. In addition, the drive source 106 may be a combination of an engine and a motor (i.e., a hybrid drive source). Note that, instead of the wheels, a pair of crawler belts (crawlers) winding around idler wheels and drive wheels may be used.

The robot arm 10 is a device that grips a pile 200 loaded on the main body unit 104 to convey the gripped pile to a vicinity of the pile driver 20 and transfers the conveyed pile to the pile driver 20. The robot arm 10 includes an arm unit 12 having an articulated joint, a swing unit 14 that swings the entire arm unit 12 about the Z-axis, and a hand unit 16 provided at a distal end of the arm unit 12. As illustrated in FIG. 1C, the hand unit 16 includes a suction unit 17 and a gripping unit 19. The suction unit 17 includes an electromagnet and magnetically sucks (i.e., attracts) the iron pile 200 by being supplied with a current to the electromagnet. In addition, the gripping unit 19 grips the pile 200. The robot arm 10 can firmly hold the pile 200 by generating a magnetic suction force using the suction unit 17 when gripping the pile 200 with the gripping unit 19. This makes it possible to prevent the pile 200 from falling when the robot arm 10 conveys the pile 200. Note that the suction unit 17 may have a mechanism that generates another suction force such as a vacuum suction force, instead of the electromagnet.

Note that, when the robot arm 10 is controlled, it is assumed that an image captured by an imaging device (not illustrated) provided in the hand unit 16 is used. By controlling the robot arm 10 based on the image, the robot arm 10 is able to precisely hold the pile 200. Note that the imaging device may not be provided in the hand unit 16. For example, the imaging device may be provided in a part of the main body unit 104 or may be provided in a drone capable of flying in a vicinity of the piling machine 100. In addition, light detection and ranging (LiDAR) may be used instead of the imaging device. The LiDAR is a sensor that conducts scanning with a pulsed laser of ultraviolet rays, visible rays, or near-infrared rays, which are electromagnetic waves. The LiDAR detects information such as a distance to an object, a shape of an object, a material of an object, and a color of an object based on emitted light and scattered light. In the present first embodiment, the LiDAR can detect a piling place and survey a pushed pile.

Figure 2A:
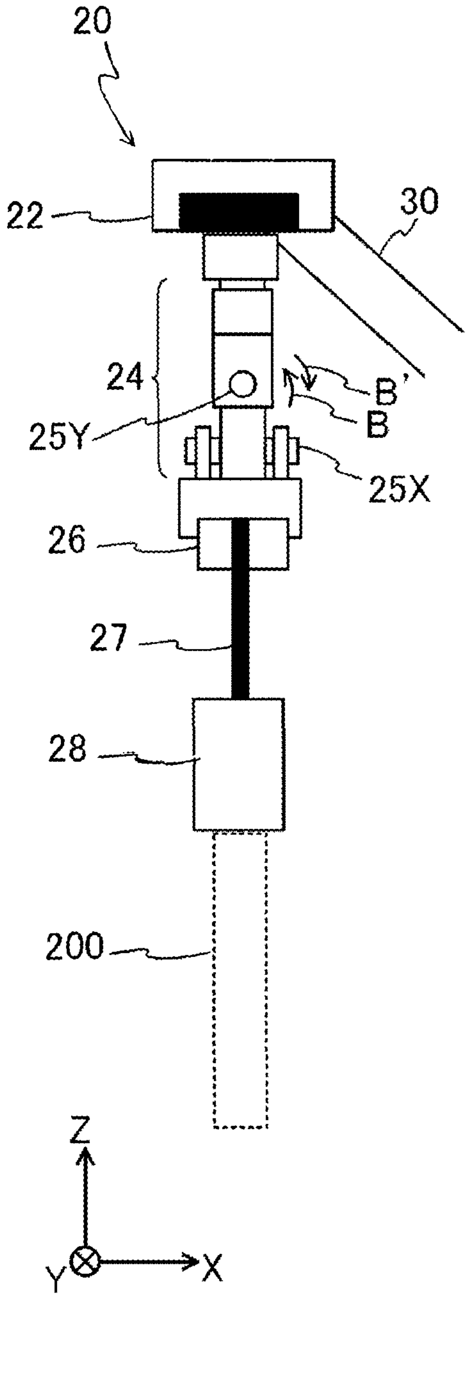
FIGS. 2A and 2B are enlarged views illustrating a pile driver.
Figure 2B:
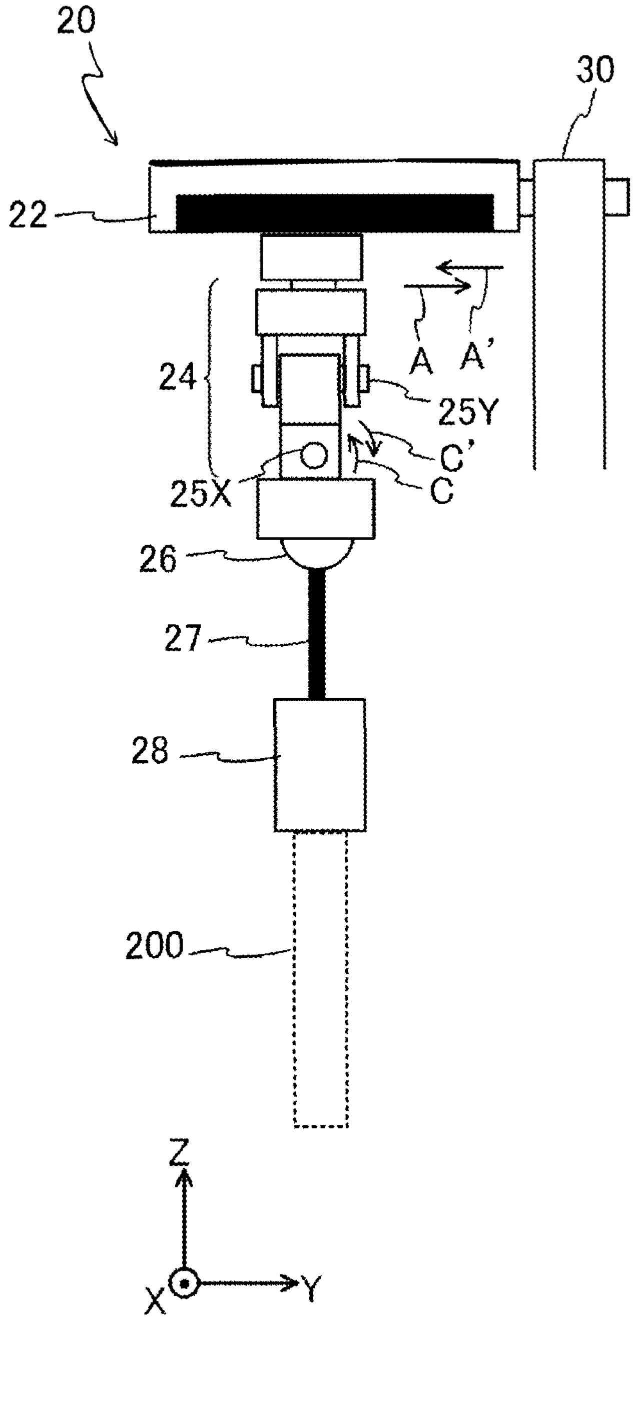

FIGS. 2A and 2B are enlarged views illustrating the pile driver 20. Note that FIG. 2A is a diagram illustrating a state of the pile driver 20 when viewed from the −Y direction, and FIG. 2B is a diagram illustrating a state of the pile driver 20 when viewed from the +X direction.

As illustrated in FIGS. 2A and 2B, the pile driver 20 includes a sliding unit 22 connected to the moving device 30, a gimbal 24 as a maintenance mechanism connected to the sliding unit 22, a wire wind-up unit 26 provided on a lower side of the gimbal 24, and a vibratory hammer 28 suspended and held by a wire 27 connected to the wire wind-up unit 26.

The sliding unit 22 is a mechanism that moves a structure of the pile driver 20 on a lower side of the gimbal 24 in the directions of the arrows A and A' (Y-axis direction) in FIG. 2B. The sliding unit 22 may be a feed screw drive mechanism, a drive mechanism using a linear motor, or another drive mechanism.

The gimbal 24 has rotary shaft 25Y and rotary shaft 25X extending in the Y-axis direction and the X-axis direction, respectively. The rotary shaft 25Y permits rotation about the Y-axis (motions in B and B' directions in FIG. 2A). The rotary shaft 25X permits rotation about the X-axis (motions in C and C' directions in FIG. 2B). For the vibratory hammer 28 to hold the pile 200 that is a heavy object as will be described later, even in a case where the ground is inclined or the main body unit 104 is inclined, the wire 27 is constantly maintained in an extending state in the perpendicular direction (i.e., the perpendicularity is maintained) by a motion of the gimbal 24. In addition, a longitudinal direction of the pile 200 held by the vibratory hammer 28 always coincides with the perpendicular direction. Note that a drive device such as a motor may be provided in the gimbal 24 to drive the gimbal 24 such that the longitudinal direction of the pile 200 coincides with the perpendicular direction.

The wire wind-up unit 26 adjusts height positions of the vibratory hammer 28 and the pile 200 held by the vibratory hammer 28 by adjusting a wind-up amount of the wire 27.

Figure 4:
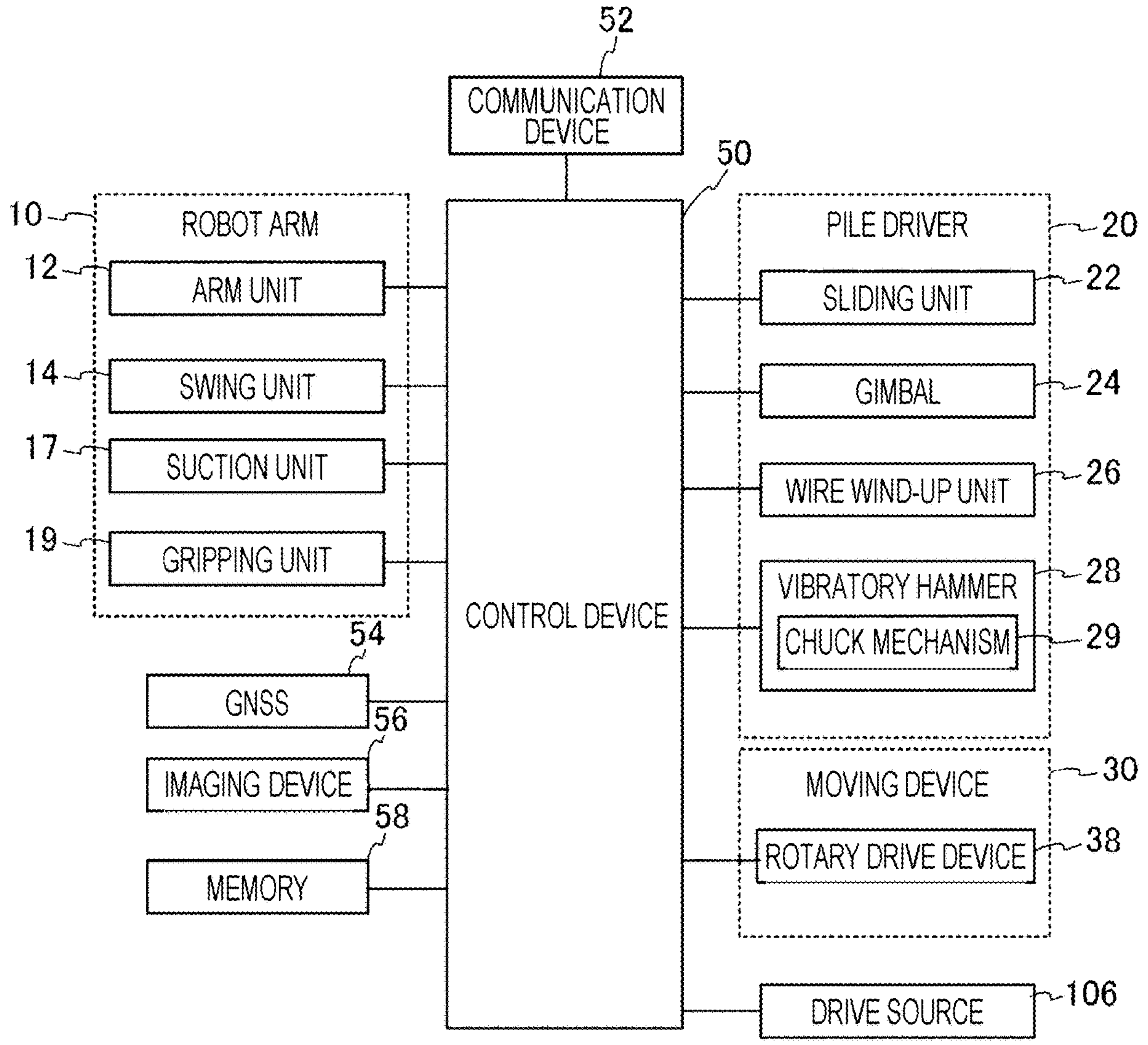
FIG. 4 is a block diagram illustrating a control system of the piling machine.

The vibratory hammer 28 holds (e.g., grips) an upper end of the pile 200 in a standing state (i.e., an upright state) by a chuck mechanism 29 (refer to FIG. 4). The vibratory hammer 28 pushes (e.g., drives) the pile 200 to a desired depth of the earth with a vibration force.

Figure 3A:
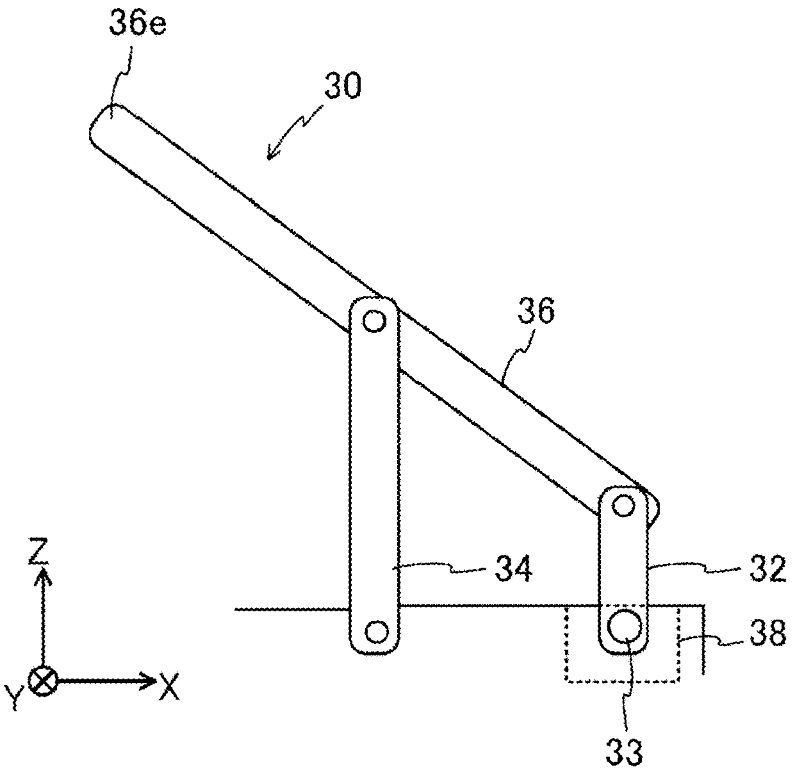
FIG. 3A is an enlarged view illustrating a moving device.
Figure 3B:
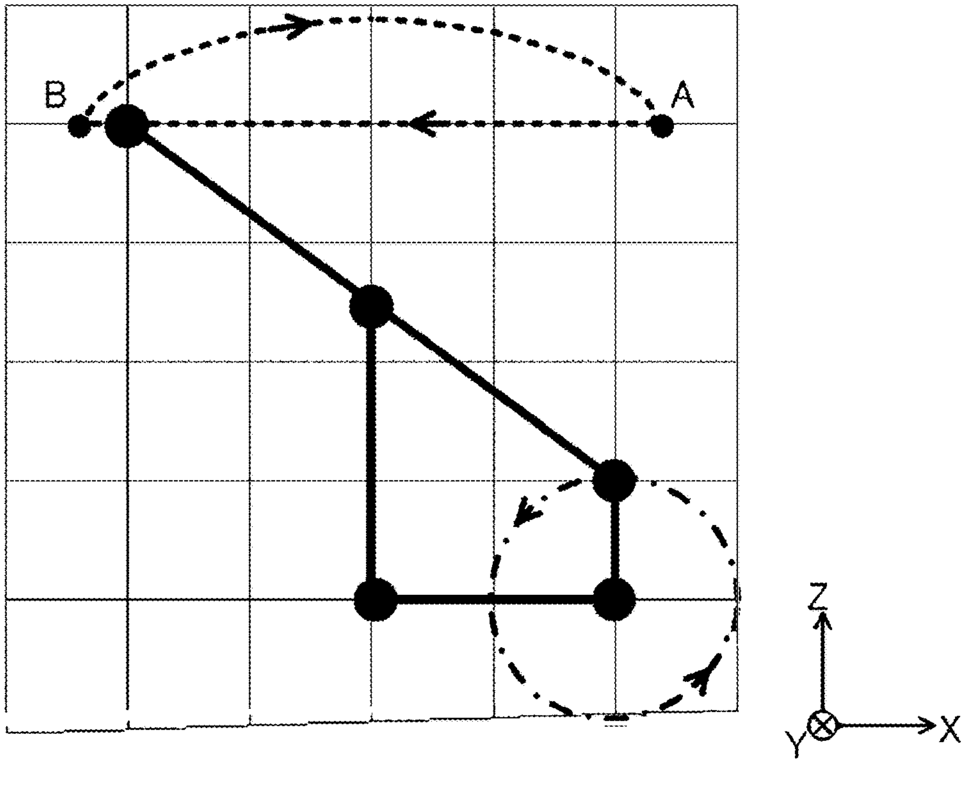
FIG. 3B is a diagram for explaining a Chebyshev's linkage mechanism.

Returning to FIG. 1A, the moving device 30 is a device that moves the pile driver 20, using a Chebyshev's linkage mechanism. FIG. 3A is an enlarged view illustrating the moving device 30, and FIG. 3B is a diagram for explaining the Chebyshev's linkage mechanism.

As illustrated in FIG. 3A, the moving device 30 includes a driving link 32, a driven link 34, an intermediate link 36, and a rotary drive device 38 that rotates the driving link 32 about a rotary shaft 33. Each link of the moving device 30 has dimensions (e.g., a length ratio) as illustrated in FIG. 3B. That is, assuming that the length of the driving link 32 is 1, the length of the driven link 34 is 2.5, and the length of the intermediate link 36 is 5. In addition, the driven link 34 is connected to a position of a midpoint of the intermediate link 36 in the longitudinal direction. By forming each link to have such dimensions, the combination of links constitutes the Chebyshev's linkage mechanism. That is, when the driving link 32 is rotated counterclockwise with the rotary shaft 33 as the center by the rotary drive device 38 (refer to the circle indicated by the dotted-dashed line in FIG. 3B), an upper end portion **36*e* of the intermediate link 36 moves to draw a locus as indicated by the broken line in FIG. 3B. This locus indicated by the broken line includes a portion extending in the X-axis direction. In other words, the Chebyshev's linkage mechanism has a function of converting rotational motion into linear motion. Therefore, according to the moving device 30, the upper end portion 36*e* of the intermediate link 36 (e.g., the portion to which the pile driver 20 is connected) can be moved in a reciprocated manner between a point A (e.g., an initial position) and a point B in FIG. 3**B, and the movement from the point A to the point B can be made along the X-axis.

FIG. 4 is a block diagram illustrating a control system of the piling machine 100. The piling machine 100 includes a control device 50, a communication device 52, a global navigation satellite system (GNSS) 54, an imaging device 56, a memory 58 (recording device), and the like, as well as the robot arm 10, the pile driver 20, the moving device 30, and the drive source 106 described above.

The control device 50 includes a central processing unit (CPU) and controls the operation of each unit when performing the piling work using the piling machine 100. The communication device 52 acquires a piling plan diagram from an external device (such as a terminal used by a worker or a host computer) and stores the acquired piling plan diagram in the memory 58. The host computer includes a CPU having higher processing performance than the CPU of the control device 50. Accordingly, various sorts of analysis such as analysis of an image captured by the imaging device 56 and analysis of an attitude of the pushed pile may be performed by the host computer. The piling plan diagram is map data indicating what positions and in what order the piles are to be pushed. The GNSS 54 serves to measure a location of the piling machine 100, using an artificial satellite. The imaging device 56, for example, images a mark indicating a piling position marked on the ground in advance or images a state of the pile after being driven. Note that the GNSS 54 and the imaging device 56 are assumed to be provided on the main body unit 104 as illustrated in FIGS. 1A, 1B, and 1C. The memory 58 stores the piling plan diagram as described above. In addition, in a case where the control device 50 analyzes an image captured by the imaging device 56 (e.g., an image obtained by imaging a state of the pile after being driven), the memory 58 stores a result of the analysis. Furthermore, the memory 58 stores various sorts of control data (such as data of the moving speed of the main body unit 104, the moving speed of the moving device 30, and the like) for use when performing the piling work.

When performing the piling work, the control device 50 of the present embodiment relatively drives the pile driver 20 in a −X direction as a first direction with respect to the main body unit 104 via the moving device 30 while driving the main body unit 104 at a constant speed in a predetermined direction (for example, a +X direction as a second direction). The speed of the pile driver 20 at this time is the same as the speed of (but toward a direction contrary to that of) the main body unit 104. This ensures that the pile driver 20 is kept unmoved with respect to the ground during the piling work.

Piling Work by Piling Machine 100

Next, an operation of the piling machine 100 during the piling work will be described in detail in line with the flowchart in FIG. 5 with appropriate reference to the other drawings. The process in FIG. 5 starts from a state in which the control device 50 has acquired the piling plan diagram via the communication device 52 and stored the acquired piling plan diagram in the memory 58. Note that, in the following description, a case where piles 200 are pushed at a plurality of places lined in the X-axis direction, using the piling machine 100, will be described. In addition, it is assumed that the piling machine 100 is positioned at a location separated by a predetermined distance on a −X side of a place where piling is performed first.

Figure 5:
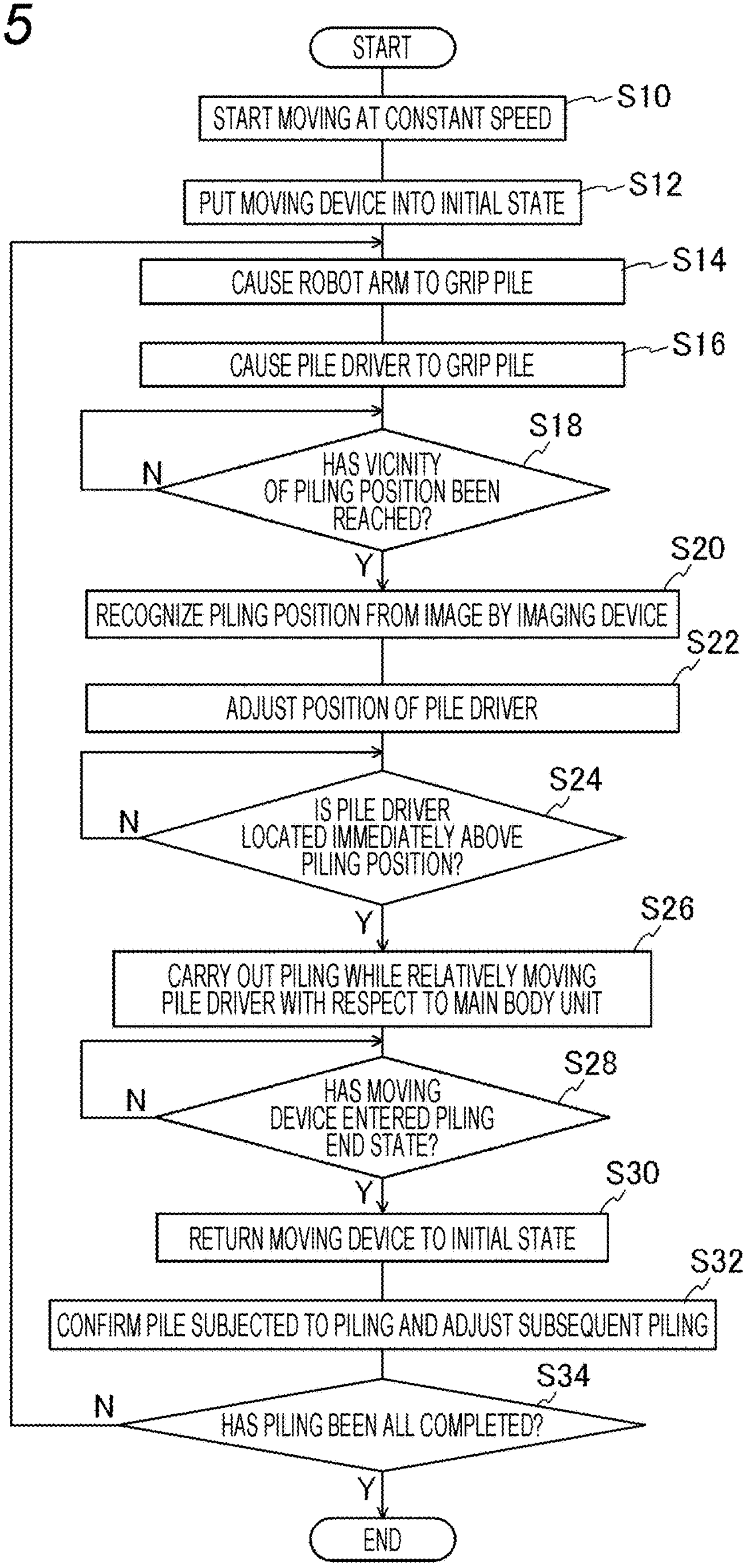
FIG. 5 is a flowchart illustrating operation of the piling machine during a piling work.
Figure 6A:
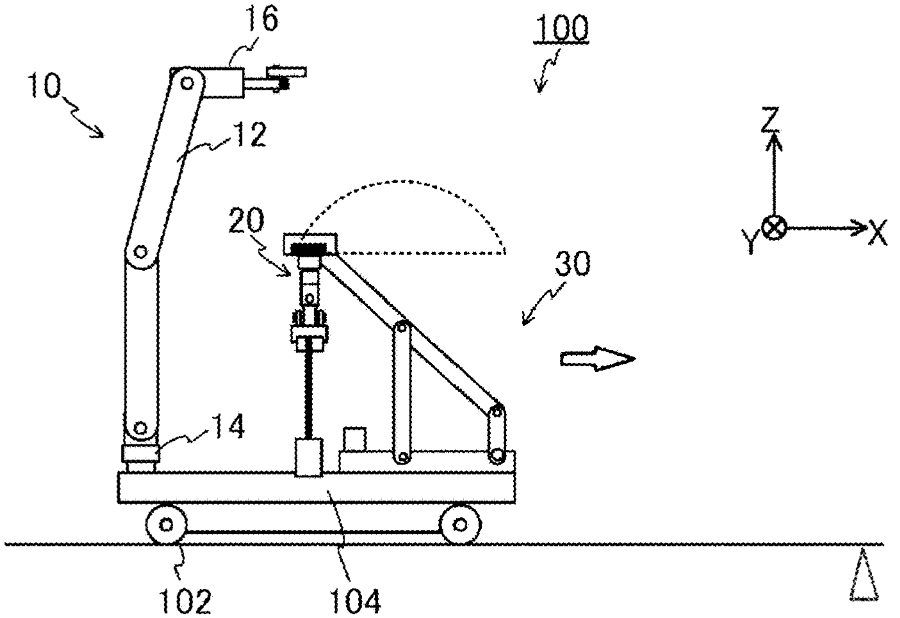
FIGS. 6A, 6B, and 6C are diagrams (part 1) illustrating motions of the piling machine.

When the process in FIG. 5 is started, the control device 50 starts moving at a constant speed toward a place where piling is performed first (step S10). In the present embodiment, the control device 50 rotationally drives the wheels of the traveling device 102 via the drive source 106, thereby moving the entire piling machine 100 in the +X direction at a constant speed. FIG. 6A illustrates a state of the piling machine 100 that has started moving in the direction of the outlined arrow at a constant speed. Note that the position indicated by the triangle mark in FIG. 6A means a place where piling is performed first (e.g., a place marked with a white line or the like).

Figure 6B:
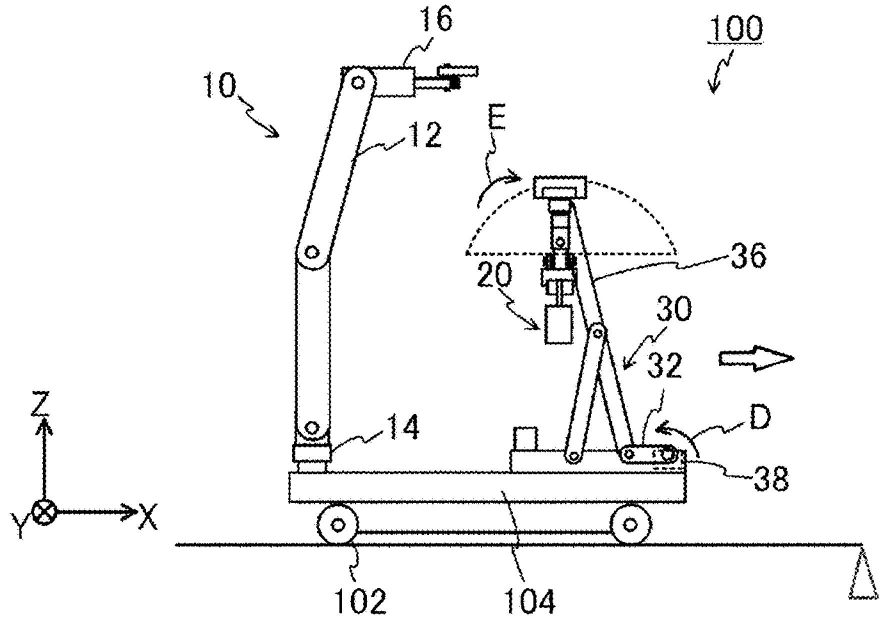

Subsequently, the control device 50 puts the moving device 30 into an initial state (step S12). The initial state means a state in which the upper end portion 36*e* of the intermediate link 36 of the moving device 30 is located at the point A (e.g., the initial position) illustrated in FIGS. 3A and 3B. As illustrated in FIG. 6B the control device 50 controls the rotary drive device 38 to rotate the driving link 32 of the moving device 30 counterclockwise (i.e., in the direction of the arrow D), thereby moving the pile driver 20 in the direction of the arrow E to put the pile driver 20 into the state illustrated in FIG. 6C. Note that the control device 50 can confirm the state of the moving device 30 (e.g., the position of the upper end portion 36*e* of the intermediate link 36) based on a result of detecting the state of the driving link 32 with an encoder or the like.

Figure 6C:
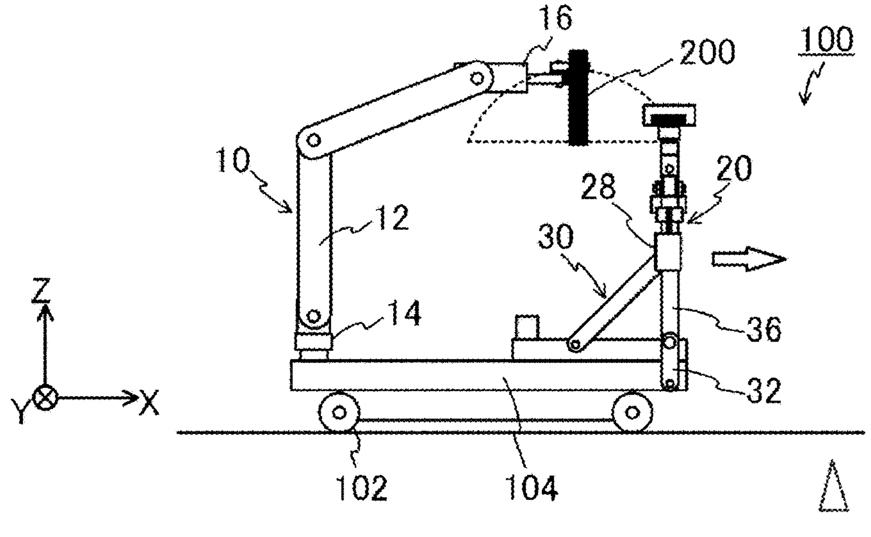

Subsequently, the control device 50 causes the robot arm 10 to grip the pile 200 (step S14). More specifically, the control device 50 controls the arm unit 12 and the swing unit 14 to bring the hand unit 16 close to the pile 200 placed on the main body unit 104 such that the hand unit 16 grips the pile 200 with the gripping unit 19 (refer to FIG. 1C) and also turns on the magnetic attraction by the suction unit 17 (refer to FIG. 1C). This can cause the robot arm 10 to grip the pile 200, as illustrated in FIG. 6C.

Figure 7A:
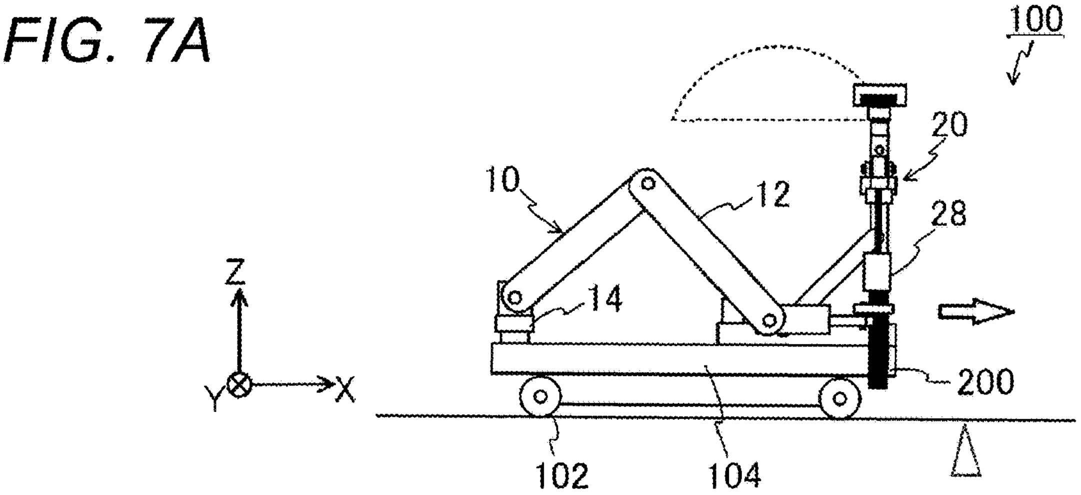
FIGS. 7A, 7B, and 7C are diagrams (part 2) illustrating motions of the piling machine.

Subsequently, the control device 50 causes the pile driver 20 to grip the pile 200 (step S16). In these circumstances, the control device 50 controls the robot arm 10 to cause the chuck mechanism 29 included in the vibratory hammer 28 of the pile driver 20 to grip an upper end portion of the pile 200. FIG. 7A illustrates a state of the pile driver 20 that has been caused to grip the pile 200 (e.g., a state of the pile 200 that has been transferred).

Subsequently, the control device 50 verifies whether a vicinity of the piling position has been reached (step S18). The control device 50 verifies whether a vicinity of the piling position has been reached based on the information in the piling plan diagram and the measurement result of the GNSS 54.

Figure 7B:
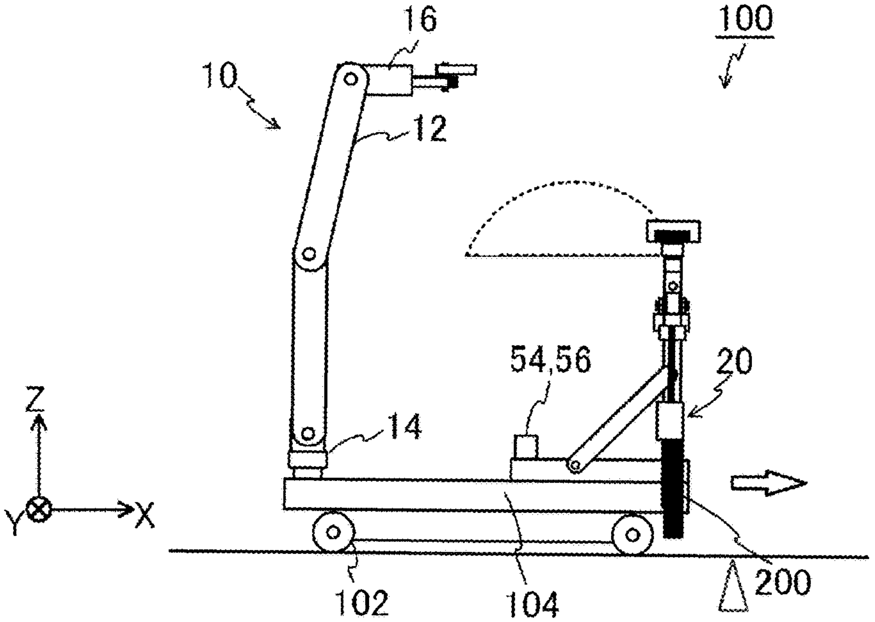

As illustrated in FIG. 7B, when the piling machine 100 has reached the vicinity of the piling position, the control device 50 images surroundings using the imaging device 56 and recognizes the piling position using the captured image (step S20).

Subsequently, the control device 50 controls the sliding unit 22 to adjust the position (Y position) of the pile driver 20 (step S22). Specifically, the control device 50 controls the sliding unit 22 based on the image captured by the imaging device 56 such that the position of the piling position in the Y-axis direction coincides with the position of the pile 200 gripped by the pile driver 20 in the Y-axis direction. Note that the position of the sliding unit 22 can be detected by a linear encoder or the like provided in the sliding unit 22.

Figure 7C:
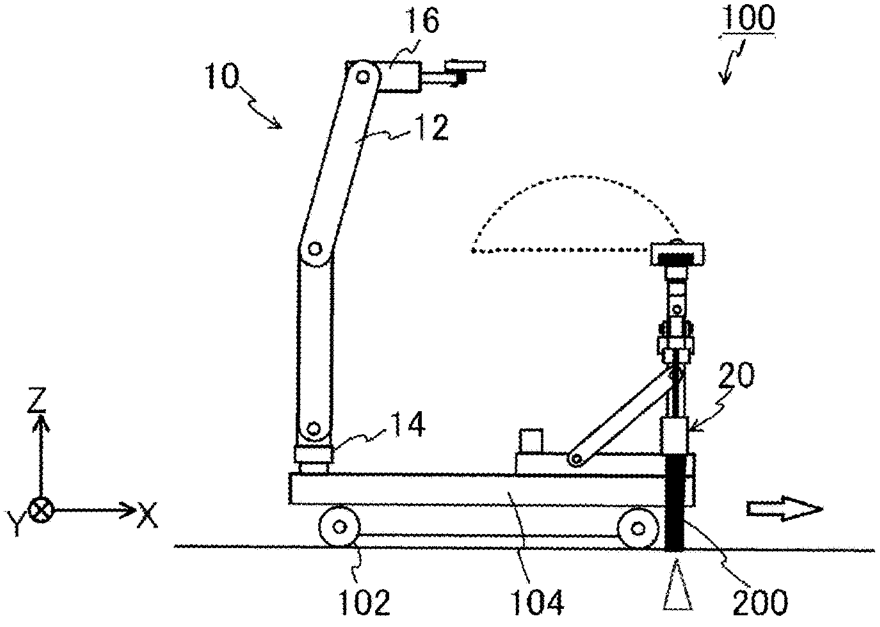

Subsequently, the control device 50 stands by until the pile driver 20 (pile 200) is positioned immediately above the piling position (step S24). Note that the control device 50 can verify whether the pile 200 has come immediately above the piling position from the image captured by the imaging device 56. In a case where the pile 200 has been positioned immediately above the piling position, the control device 50 carries out piling while relatively moving the pile driver 20 with respect to the main body unit 104 (step S26). At this time, the control device 50 controls the rotary drive device 38 such that the moving speed of the pile driver 20 in the −X direction coincides (e.g., offsets, equals, etc.) with the moving speed of the main body unit 104. This maintains a state (e.g., a stationary state) of the pile 200 as unmoved with respect to the ground. Therefore, the control device 50 starts the driving of the pile 200 by the vibratory hammer 28 with the pile 200 in an unmoved state with respect to the ground. FIG. 7C illustrates a state in which the driving has started.

Figure 8A:
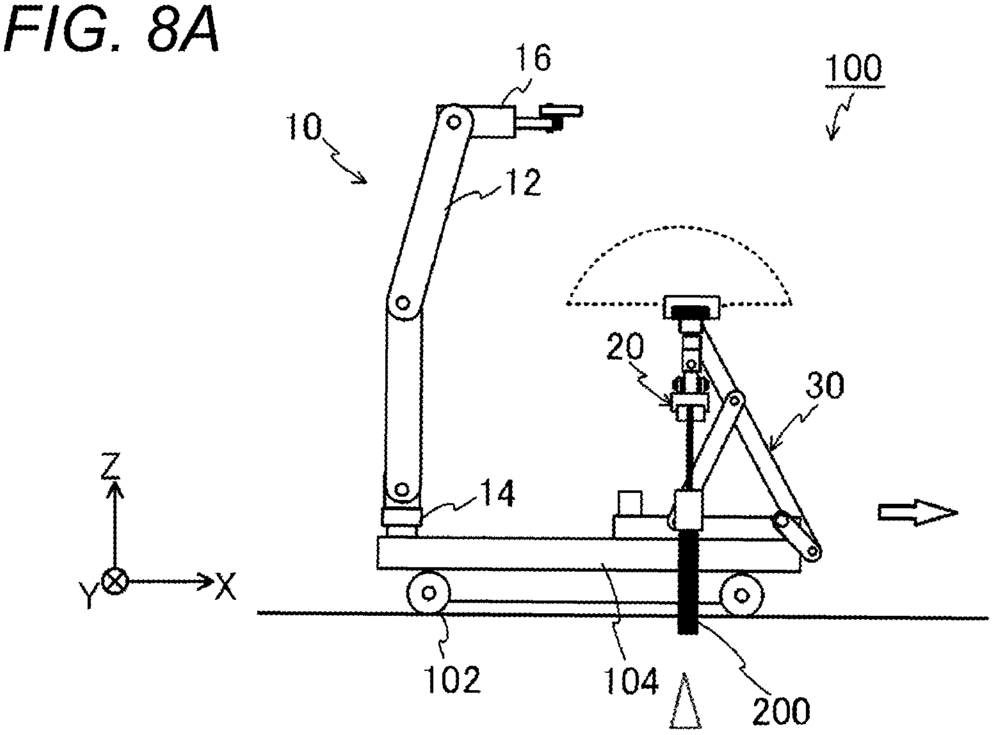
FIGS. 8A and 8B are diagrams (part 3) illustrating motions of the piling machine.
Figure 8B:
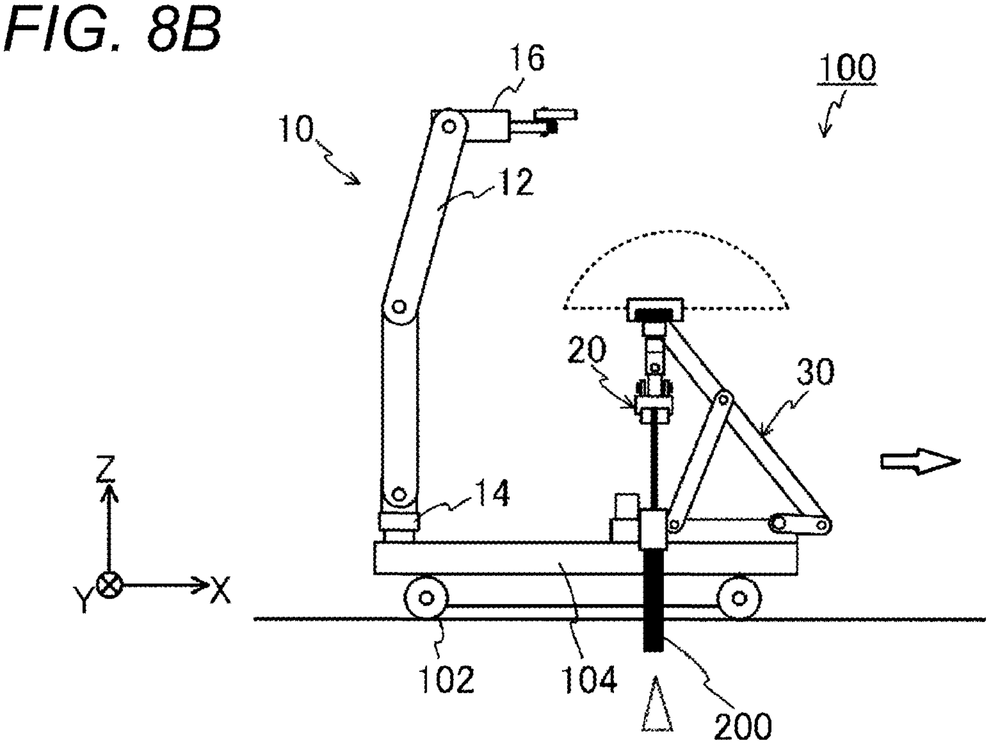
Figure 9A:
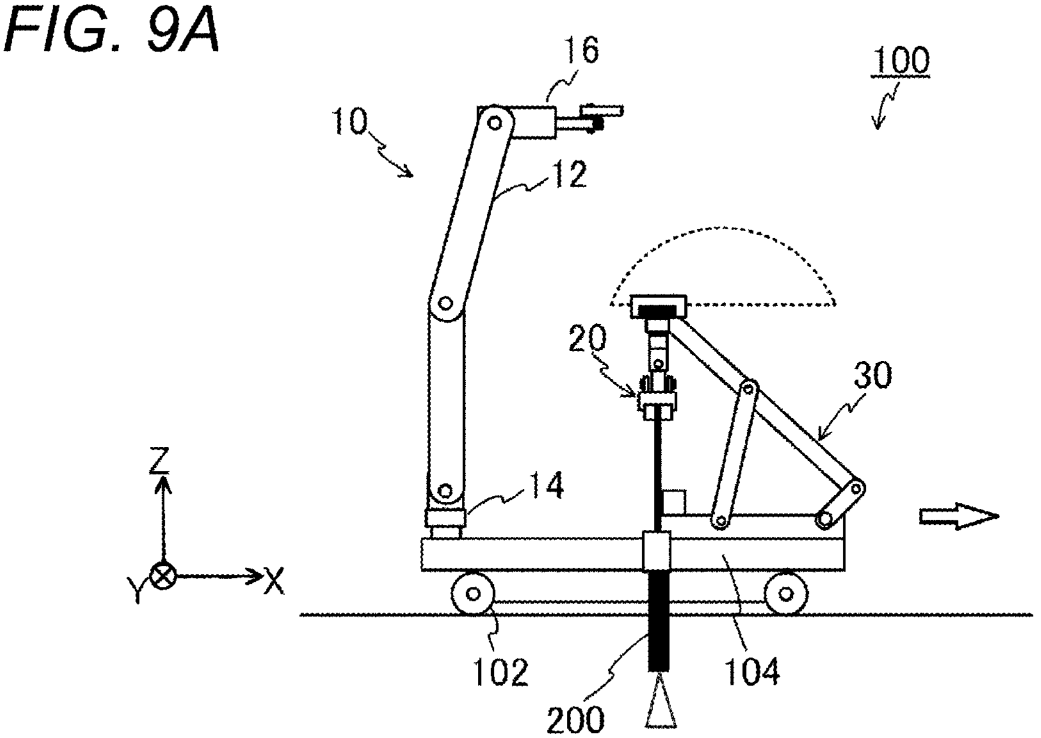
FIGS. 9A and 9B are diagrams (part 4) illustrating motions of the piling machine.
Figure 9B:
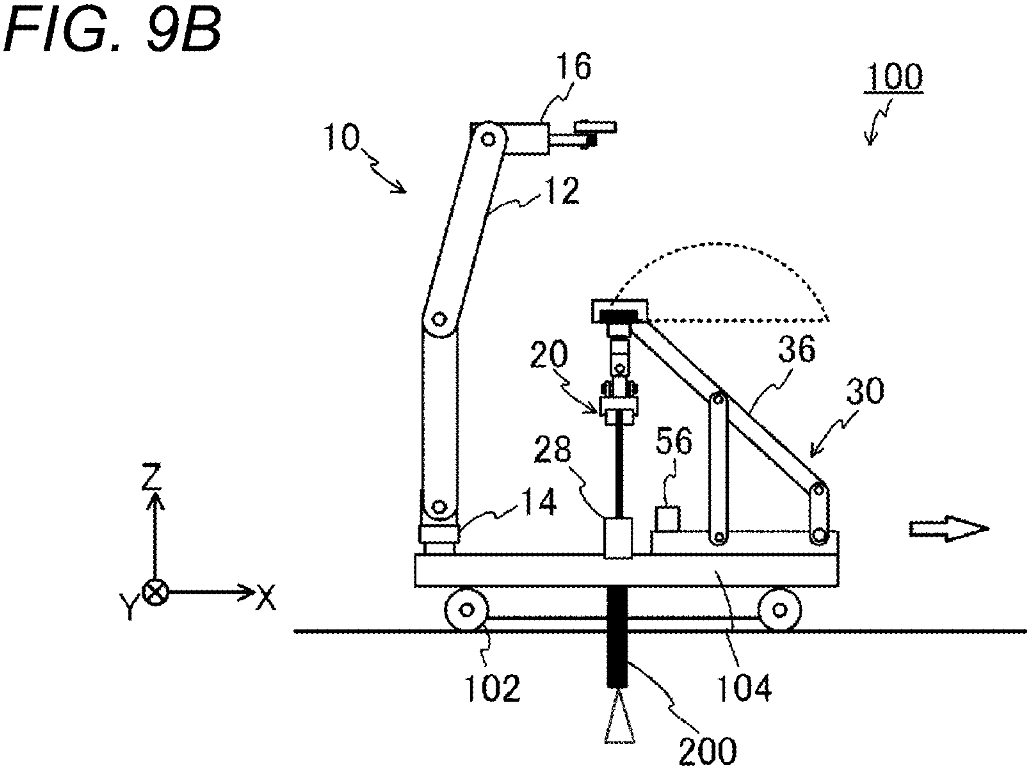

Subsequently, the control device 50 stands by until the moving device 30 enters a piling end state (step S28). The piling end state means a state in which the upper end portion 36*e* of the intermediate link 36 of the moving device 30 has transitioned successively in the order of FIGS. 8A, 8B, and 9A and has matched the position closest to the −X side of a moving range (the point B in FIG. 3B), as illustrated in FIG. 9B. Note that, in the present embodiment, the moving speed of the main body unit 104 and the moving speed of the moving device 30 are predefined such that the piling is finished when the moving device 30 matches the position in FIG. 9B, but this point will be described in detail later.

When the state in FIG. 9B is met, the control device 50 releases the grip of the pile 200 by the vibratory hammer 28 (i.e., the chuck mechanism 29). In addition, the control device 50 returns the moving device 30 to the initial state (step S30). This process of returning the moving device 30 to the initial state is similar to step S12 described above.

Subsequently, the control device 50 images the state of the pile 200 subjected to the piling using the imaging device 56 and analyzes the captured image to confirm whether the piling has been appropriately performed. The control device 50 confirms whether the pile 200 has been pushed straight, whether the pile 200 has been pushed by an appropriate length, and the like using image analysis. In addition, in a case where the piling has not been appropriately performed, the control device 50 adjusts the subsequent piling (step S32). For example, in a case where the pile 200 has not been allowed to be sufficiently pushed as shown in the image analysis, the earth may be likely to be firm. Therefore, the control device 50 adjusts (e.g., slows) the moving speed of the main body unit 104 and the moving speed of the moving device 30 to ensure that the pile 200 can be sufficiently pushed. Conversely, in a case where the pile 200 has been pushed deeper than expected, the earth may be likely to be loose. Therefore, to avoid the pile 200 from being pushed too much, the control device 50 enhances the moving speed of the main body unit 104 and the moving speed of the moving device 30, or the control device 50 makes the operation time (i.e., driving time) of the vibratory hammer 28 shorter. That is, in the present embodiment, the control device 50 implements a detection device that detects the state of the pile 200 from the image captured by the imaging device 56 and an adjustment device that adjusts the way of driving a pile to be driven thereafter based on the state of the pile 200.

Note that, in step S32, in a case where the pile 200 has not been appropriately driven, data of location information of the pile 200, necessity of correction, necessity of re-driving, and the like are added to the piling plan diagram. In addition, the control device 50 may transmit the location information of the pile 200 that needs to be corrected or re-driven to the terminal or the host computer described above with the communication device 52. The location information of the pile 200 that needs to be corrected or re-driven may also be displayed on a display device (not illustrated) of the terminal or the host computer described above. This allows the worker to confirm which pile needs to be driven again, for example.

Thereafter, the control device 50 verifies whether all piling has been completed (step S34). In a case where the verification is negative, the above-described process is repeated by returning to step S14. Note that the process in step S14 (i.e., the process of causing the robot arm 10 to grip the pile) may be finished in advance before the verification in step S34 becomes affirmative. That is, the robot arm 10 may grip the pile 200 beforehand concurrently with the piling work by the pile driver 20.

Thereafter, in a case where the verification in step S34 is affirmative, the entire process in FIG. 5 ends.

Method for Determining Moving Speed

Next, a method for determining the moving speeds of the main body unit 104 and the moving device 30 will be described in detail with reference to FIG. 10.

Figure 10:
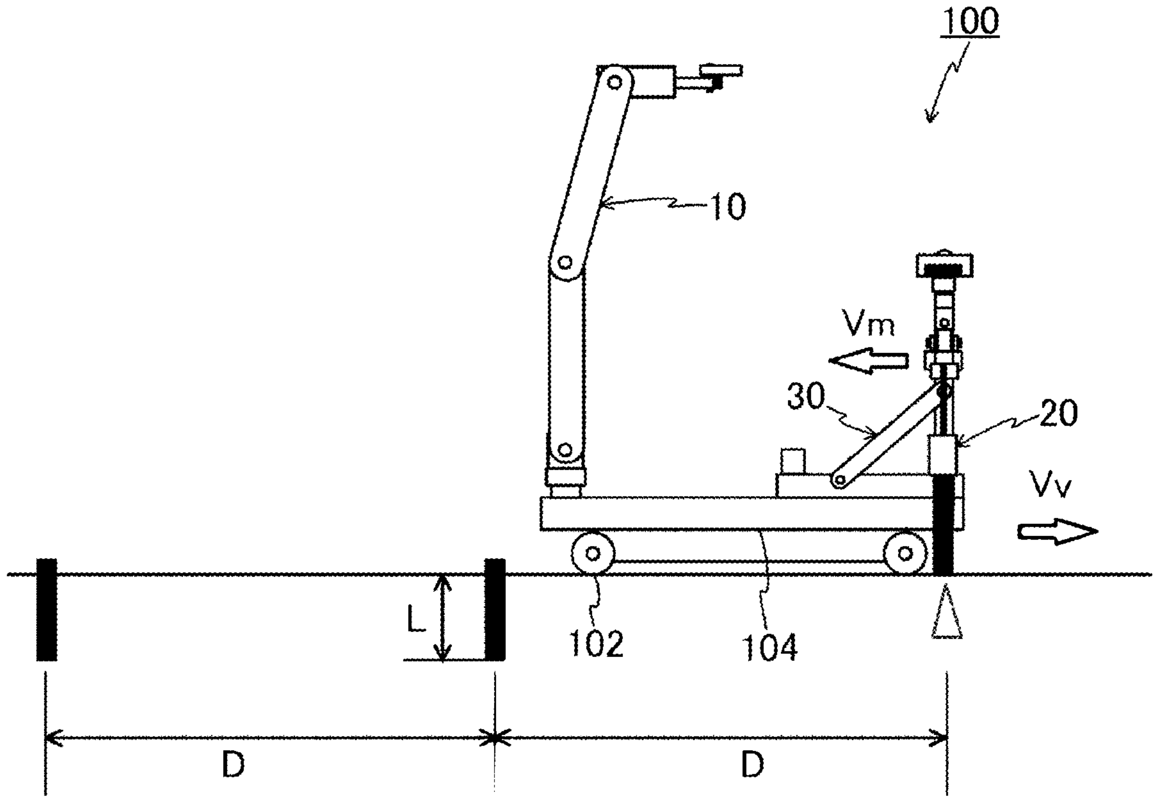
FIG. 10 is a diagram explaining a method for determining moving speeds of a main body unit and the moving device.

As illustrated in FIG. 10, a pile driving interval is defined as D (m), a pile driving length is defined as L (m), the moving speed of the main body unit 104 is defined as Vv (m/min), and the moving speed of the moving device 30 (i.e., the pile driver 20) is defined as Vm (m/min). In addition, the pile driving speed of the pile driver 20 is defined as Vp (m/min).

In these circumstances, time Tp (min) taken by the pile driver 20 to drive the pile is expressed by following Formula (1).

$$Tp = L/Vp \tag{1}$$

In addition, when time Tb (min) taken by the moving device 30 to return to the point A from the point B in FIG. 3B is defined as ½ of pile driving time Tp, the time Tb is expressed by following Formula (2).

$$Tb = Tp/2 \tag{2}$$

Then, when the time until the robot arm 10 causes the pile driver 20 to grip the pile 200 (e.g., the time during which the moving device 30 is stopped at the point A in FIG. 3B) is assumed as Tw, pile driving cycle time T (e.g., the time required to drive one pile) is expressed by following Formula (3).

$$T = Tb + Tw + Tp \tag{3}$$

In the present embodiment, because it is sufficient to move by the distance D (i.e., the pile driving interval) during the pile driving cycle time T, a value obtained from following Formula (4) can be set as the moving speed Vv of the main body unit 104.

$$Vv = D/T \tag{4}$$

Note that the moving speed Vm of the moving device 30 (i.e., the pile driver 20) only needs to have a value obtained from following Formula (5).

$$Vm = -Vv \tag{5}$$

FIG. 11 illustrates exemplary settings of the moving speeds Vv and Vm. For example, in a case where the interval between the piles is 2 m and the pile driving speed is 2 m/min, the moving speeds Vv and Vm can be set to values as illustrated in FIG. 11 when the pile driving length is set to any one of 0.5 m, 1 m, or 1.5 m.

As described above in detail, the piling machine 100 according to the present embodiment includes the main body unit 104 including the traveling device 102, the pile driver 20 that performs piling, and the moving device 30 that is connected to the main body unit 104 and moves the pile driver 20. The control device 50 performs piling while the traveling device 102 is traveling (e.g., while the main body unit 104 is moving). This reduces the number of times the traveling device 102 stops, and thus, the number of times of acceleration and deceleration can also be reduced. Thereby, energy efficiency can be improved. In addition, by performing piling without stopping the traveling device 102, the construction period for the piling work can be shortened compared to a case where piling is performed with the traveling device 102 in a stopped state after moving to a vicinity of the piling position and having a stop.

In addition, in the present embodiment, the control device 50 moves the pile driver 20 in a predetermined direction (for example, the −X direction) with the moving device 30 while the pile driver 20 performs piling. This predetermined direction (−X direction) is a direction opposite to the direction in which the main body unit 104 moves while the pile driver 20 performs piling. In addition, the main body unit 104 and the pile driver 20 have the same moving speed (but toward opposite directions). This allows piling to be performed with the pile 200 and the pile driver 20 in a stationary state with respect to the ground, and thus, the pile 200 can be accurately driven without producing inclination or the like.

In addition, in the present embodiment, the moving speed Vv of the main body unit 104 and the moving speed Vm of the moving device 30 may be determined based on the distance D between two piles consecutively driven by the pile driver 20, the pile driving length L, and the pile driving speed Vp of the pile driver 20. This allows the control device 50 to set the moving speeds Vv and Vm to appropriate speeds.

In addition, in the present embodiment, the moving speed Vv of the main body unit 104 and the moving speed Vm of the moving device 30 may be determined based on the time Tb taken by the moving device 30 to return to the point A from the point B in FIG. 3B and the time Tw until the robot arm 10 causes the pile driver 20 to grip the pile. This allows the moving speeds Vv and Vm to be set to appropriate speeds.

In addition, in the present embodiment, the moving device 30 uses the Chebyshev's linkage mechanism that converts rotational motion into linear motion. This allows the pile driver 20 to be linearly moved with a simple configuration.

In addition, in the present embodiment, the pile driver 20 includes the gimbal 24. The gimbal 24 makes it possible to maintain the perpendicularity of the wire 27 suspending and holding the vibratory hammer 28 and the pile 200 gripped by the vibratory hammer 28. Therefore, the pile 200 can be accurately pushed.

In addition, in the present embodiment, the control device 50 adjusts the way of driving a pile to be driven thereafter based on an image obtained by imaging a state of the pile 200 driven by the pile driver 20. This allows the way of driving to be adjusted in a case where the driving has failed such that the failure no longer occurs thereafter.

In addition, in the present embodiment, because the control device 50 displays, on the display device (not illustrated), the location information of the pile 200 that has not been appropriately driven, needs correction, needs re-driving, and the like as described above, the worker can easily confirm information on the pile that needs to be corrected or re-driven. For example, the display device can display information regarding correction of a driven pile, based on a detection result of a detection device.

In addition, in the present embodiment, the robot arm 10 that supplies the pile 200 to the pile driver 20 includes the suction unit 17 that sucks the pile 200 and the gripping unit 19 that grips the pile 200. This allows the suction unit 17 to assist the gripping of the pile 200 by the gripping unit 19, and thus, the pile 200 can be prevented from falling.

Note that, in the above embodiment, a case has been described in which the moving device 30 moves the pile driver 20 in a direction (−X-axis direction) opposite to the moving direction (+X direction) of the main body unit 104 when the pile driver 20 drives a pile. However, the present invention is not limited thereto, and the moving device 30 may move the pile driver 20 in a direction including a direction opposite to the moving direction of the main body unit 104 as a component (for example, in an in-XZ plane direction). In these circumstances, the pile driver 20 only needs to adjust the wire wind-up unit 26 as appropriate such that the position of the vibratory hammer 28 has an appropriate position.

Second Embodiment

Figure 12A:
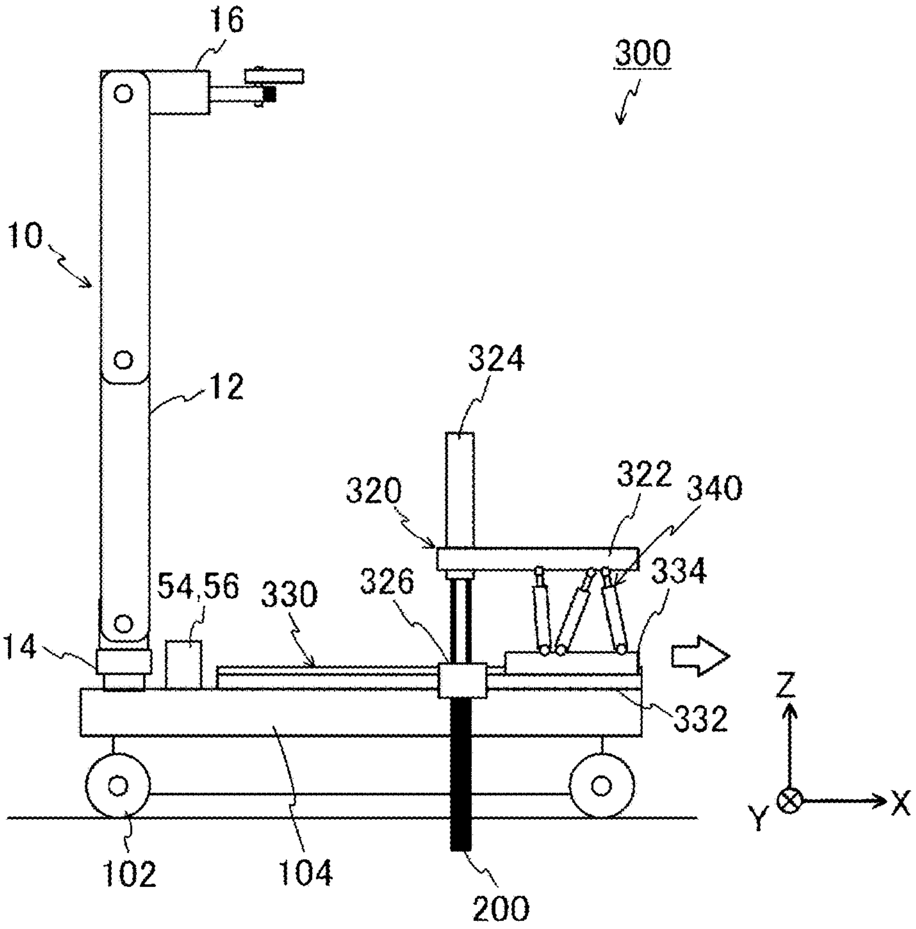
FIGS. 12A, 12B, and 12C are schematic diagrams illustrating a piling machine according to a second embodiment.
Figure 12B:
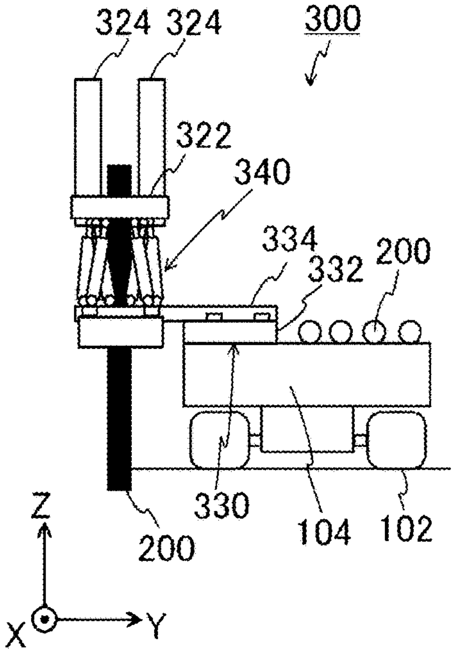
Figure 12C:
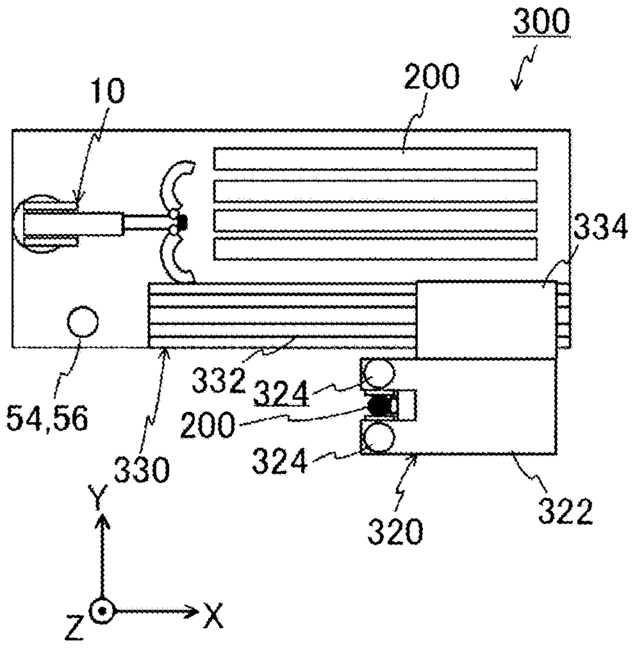

Next, a second embodiment will be described with reference to FIGS. 12A, 12B, and 12C. FIG. 12A is a diagram illustrating a state of a piling machine 300 according to the second embodiment when viewed from the −Y direction, FIG. 12B is a diagram illustrating a state of the piling machine 300 when viewed from the +X direction, and FIG. 12C is a diagram illustrating a state of the piling machine 300 when viewed from the +Z direction. Note that the same constituent members as those of the first embodiment will be denoted by the same reference signs, and the description thereof will be omitted.

The piling machine 300 includes a pile driver 320 using a hydraulic jack instead of the pile driver 20 of the first embodiment (i.e., the pile driver 20 having the vibratory hammer 28). In addition, the piling machine 300 includes a sliding mechanism 330 instead of the moving device 30 of the first embodiment.

The sliding mechanism 330 includes a stator 332 fixed on a main body unit 104 and a mover 334 that slides and moves on the stator 332 along the X-axis direction. The sliding mechanism 330 may be a linear motor, a feed screw drive mechanism, or another drive mechanism.

The pile driver 320 includes a table 322, a pair of hydraulic jacks 324 provided on the table 322, and a pair of gripping mechanisms 326, each connected to one of the pair of hydraulic jacks 324. The pair of gripping mechanisms 326 has a chuck mechanism that grips a pile 200. In a case where the pair of gripping mechanisms 326 grips the pile 200, a robot arm 10 conveys and transfers the pile 200 loaded on the main body unit 104. The hydraulic jack 324 applies a press-fitting force to the pile 200 gripped by the pair of gripping mechanisms 326.

An actuator 340 that drives the table 322 in directions of six degrees of freedom is provided between the table 322 and the mover 334. As the actuator 340, a parallel linkage mechanism or the like can be used. Note that the parallel linkage mechanism has a mechanical structure in which the table 322 and the mover 334, which are a pair of plate members, are coupled in parallel by a plurality of actuators 340. Similar to the gimbal 24 and the sliding unit 22 of the first embodiment, the actuator 340 is used to adjust the position of the pile 200 in the Y-axis direction and maintain the perpendicularity. Note that, in the first embodiment, the gimbal 24 permits a change in the rotation direction of the vibratory hammer 28 about the X-axis and the Y-axis, and the sliding unit 22 adjusts the position of the vibratory hammer 28 in the Y-axis direction. Therefore, also in the present second embodiment, a mechanism other than the parallel linkage mechanism may be adopted for the table 322 so long as the mechanism can drive the table 322 in directions of three degrees of freedom, namely, the rotation directions about the X-axis and the Y-axis and the Y-axis direction.

The configuration of the piling machine 300 of the second embodiment is different from the configuration of the piling machine 100 of the first embodiment as described above, but the operation at the time of piling work is similar to that of the first embodiment. That is, when performing the piling work, a control device 50 of the piling machine 300 of the second embodiment relatively drives the pile driver 320 in the −X direction with respect to the main body unit 104 via the sliding mechanism 330, while driving the main body unit 104 in a predetermined direction (for example, the +X direction) at a constant speed. By making the speed of the pile driver 20 at this time the same as the speed of (but toward a direction opposite to that of) the main body unit 104, the pile driver 20 is kept unmoved with respect to the ground during the piling work. In addition, the control device 50 controls the position and attitude of the table 322, using the actuator 340, to align the position of the pile 200 with the piling position and maintain the perpendicularity of the pile.

As described above, according to the second embodiment, the piling machine 300 includes the main body unit 104 including a traveling device 102, the pile driver 320 that performs piling, and the sliding mechanism 330 that is connected to the main body unit 104 and moves the pile driver 320. The control device 50 performs piling while the traveling device 102 is traveling (e.g., while the main body unit 104 is moving). This reduces the number of times the traveling device 102 stops, and thus, the number of times of acceleration and deceleration can also be reduced. Therefore, energy efficiency can be improved. In addition, by performing piling without stopping the traveling device 102, the throughput of the piling work can be improved compared to a case where piling is performed with the traveling device 102 in a stopped state after moving to a vicinity of the piling position and having a stop.

FIG. 13 illustrates example settings of the moving speed Vv of the main body unit 104 and the moving speed Vm of the pile driver 320 in the second embodiment. The moving speeds Vv and Vm can be set by a method similar to the method in the above-described first embodiment. For example, in a case where the interval between the piles is 2 m, and the pile driving speed is 8 m/min, the moving speeds Vv and Vm can be set to values as illustrated in FIG. 13 when the pile driving length is set to any one of 3 m, 4 m, or 5 m.

Note that, in the second embodiment described above, a case where, while the main body unit 104 is moving, the piling machine 300 drives the pile 200 while the pile driver 320 provided in the main body unit 104 relatively moves toward a contrary direction with respect to the main body unit 104 has been described. However, the piling machine 300 is not limited thereto and may pull out the pile 200 driven into the earth by the action of the hydraulic jacks 324 while the pile driver 320 relatively moves toward an opposing direction with respect to the main body unit 104 while the main body unit 104 is moving. In this manner, for example, energy efficiency at the time of removing piles in a mega-solar power generation facility or the like can be improved.

Modification 1

In the above-described first and second embodiments, a case where the robot arm 10 directly transfers the pile 200 loaded on the main body unit 104 to the pile driver 20 or the pile driver 320 has been described, but the resent invention is not limited thereto. For example, the transfer position of the pile 200 to the pile driver 20 or the pile driver 320 is assumed to be the position indicated by the broken lines in FIGS. 14A and 14B. In these circumstances, a transfer mechanism 500 that mediates the transfer of the pile 200 between the robot arm 10 and the pile driver 20 or the pile driver 320 may be provided in a vicinity of the transfer position indicated by the broken lines. Note that it is assumed that the transfer mechanism 500 is installed on the main body unit 104.

Figure 14A:
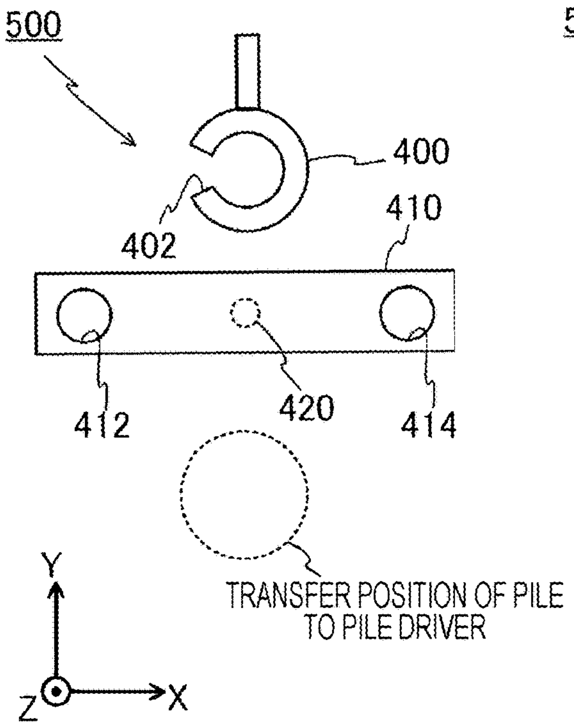
FIGS. 14A, 14B, 14C, and 14D are diagrams for explaining a transfer mechanism according to Modification 1.
Figure 14B:
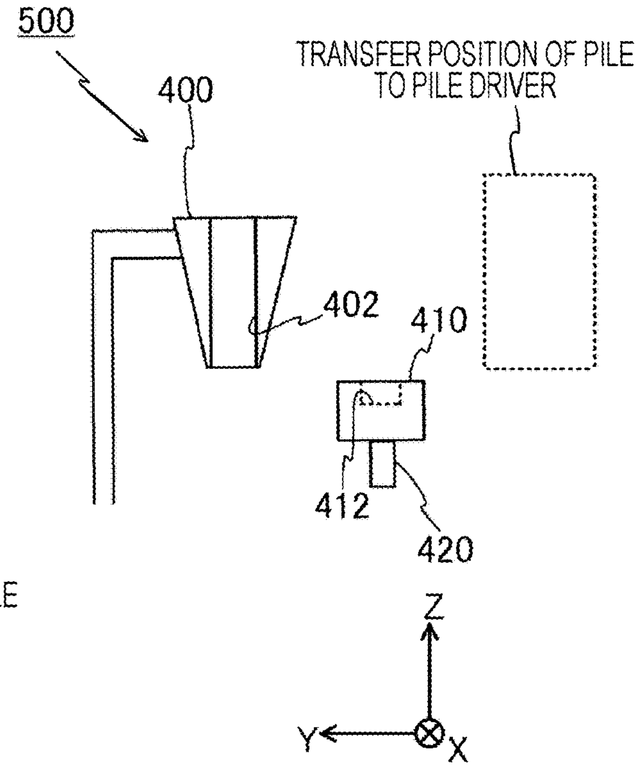

As illustrated in FIGS. 14A and 14B, the transfer mechanism 500 includes a tapered container 400 and a supplier 410. The tapered container 400 has a function of guiding the pile 200 conveyed by the robot arm 10 to the supplier 410. Note that a notch 402 having a size large enough to allow the pile 200 to pass through is provided on a −X side surface of the tapered container 400.

In one example, the supplier 410 has a rectangular parallelepiped shape and is rotatable about the Z-axis with a rotary shaft 420 as the center. In a vicinity of two end portions in the longitudinal direction of an upper surface of the supplier 410, the recess 412 and the recess 414 are provided, each having a size into which one end portion of the pile 200 can be fitted. The recess 412 and the recess 414 function as holding units capable of holding the pile 200 in an upright state and being movable between a first position and a second position. In the state in FIGS. 14A and 14B, no recess 412 or the recess 414 exists below the tapered container 400. However, as illustrated in FIGS. 14C and 14D, when the supplier 410 rotates about the Z-axis with the rotary shaft 420 as the center, the recess 412 (or the recess 414) is positioned below the tapered container 400 (e.g., a first position).

Figure 14C:
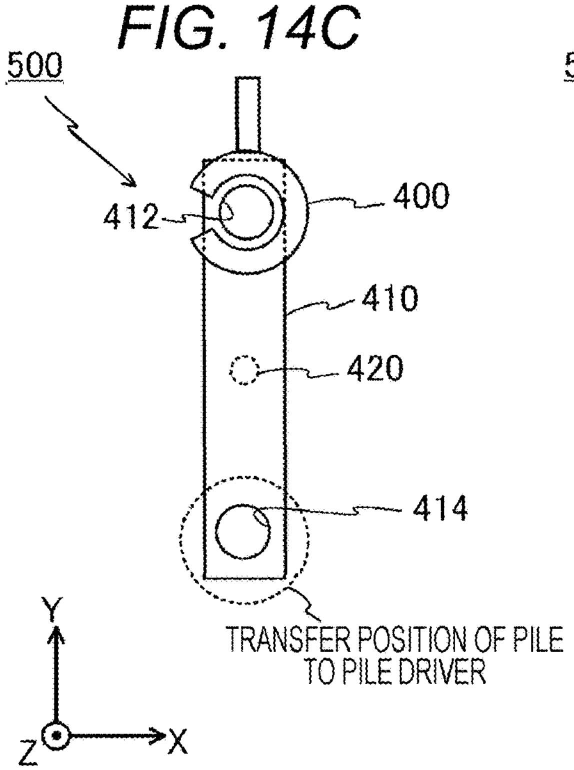
Figure 14D:
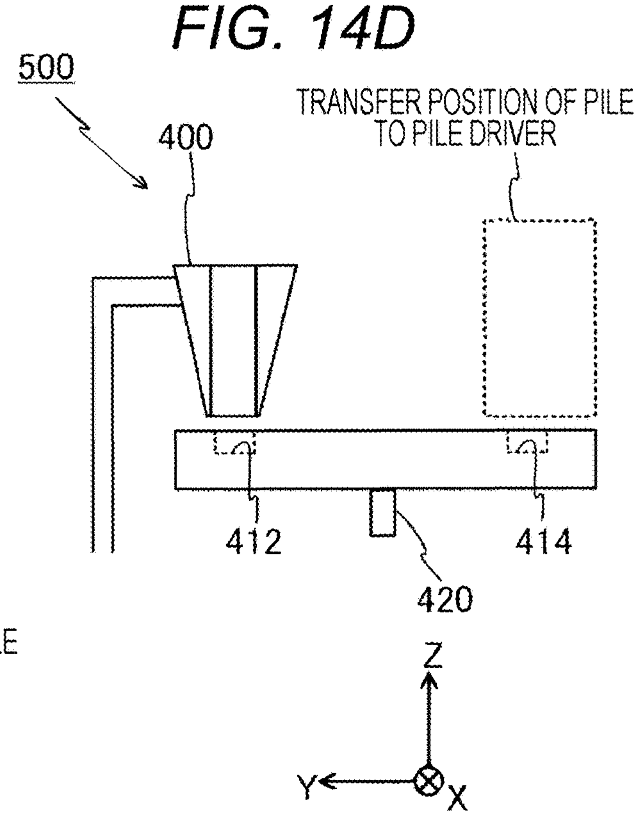
Figure 15A:
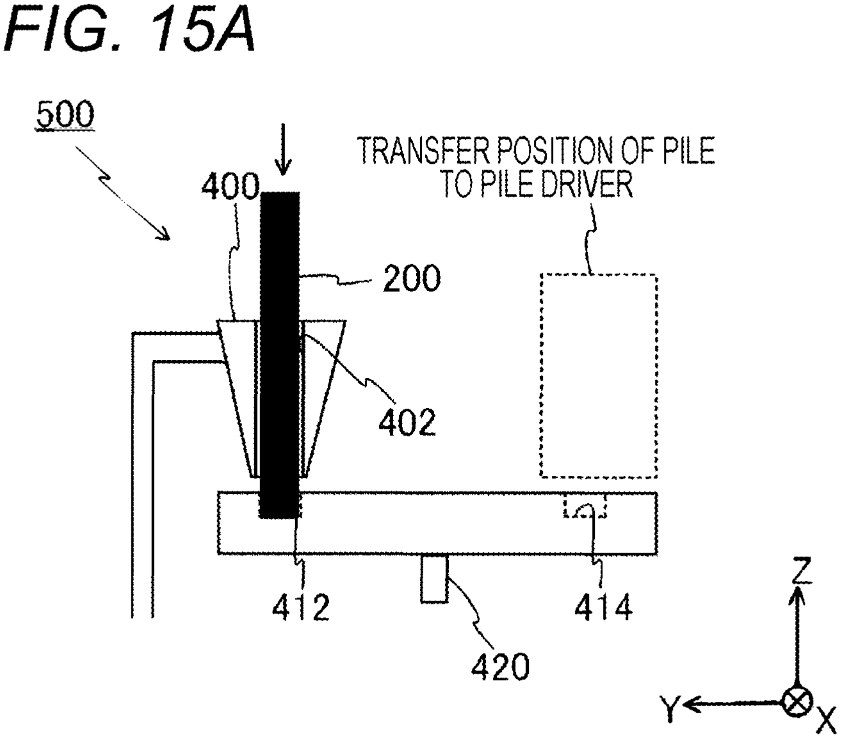
FIGS. 15A and 15B are diagrams for explaining a pile transfer method using the transfer mechanism according to Modification 1.

In Modification 1, the robot arm 10 inserts the pile 200 into the tapered container 400 from above in the state in FIGS. 14C and 14D, as illustrated in FIG. 15A. This ensures that the pile 200 is guided by the tapered container 400, one end portion (e.g., a lower end portion) of the pile 200 is fitted into the recess 412 of the supplier 410, and the pile 200 is held in an upright state.

Figure 15B:
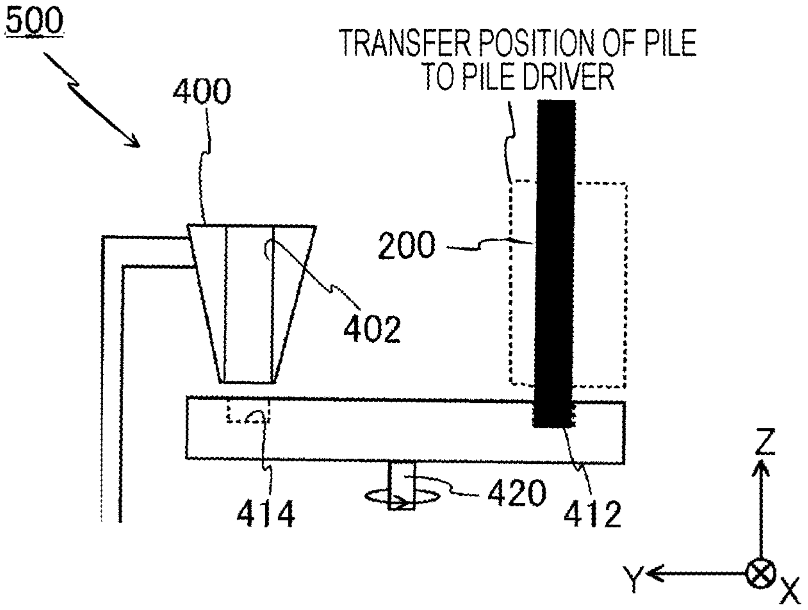

Then, from this state, as illustrated in FIG. 15B, the supplier 410 rotates about the Z-axis with the rotary shaft 420 as the center, whereby the pile 200 passes through the notch 402 and moves to the transfer position (e.g., a second position) indicated by the broken line. This allows the transfer mechanism 500 to transfer the pile 200 to the pile driver 20 or the pile driver 320. Note that, before the pile driver 20 or the pile driver 320 starts piling, the supplier 410 rotates by 90° about the rotary shaft 420 to enter the state in FIGS. 14A and 14B.

In Modification 1, while the transfer mechanism 500 transfers the pile 200 to the pile driver 20 or the pile driver 320, the robot arm 10 can come above the main body unit 104 to receive the next pile 200. That is, the operation of the robot arm 10 to convey the pile 200 and the operation of the transfer mechanism 500 to transfer the pile 200 to the pile driver 20 or the pile driver 320 can be performed concurrently. This may shorten the time required to convey the pile 200 (e.g., the time Tw in the first embodiment).

Modification 2

Next, Modification 2 will be described. Modification 2 is characterized in that the device for supplying the pile 200 to the transfer mechanism 500 of Modification 1 is not the robot arm 10 but is a supply platform 600 as illustrated in FIGS. 16A and 16B.

Figure 16A:
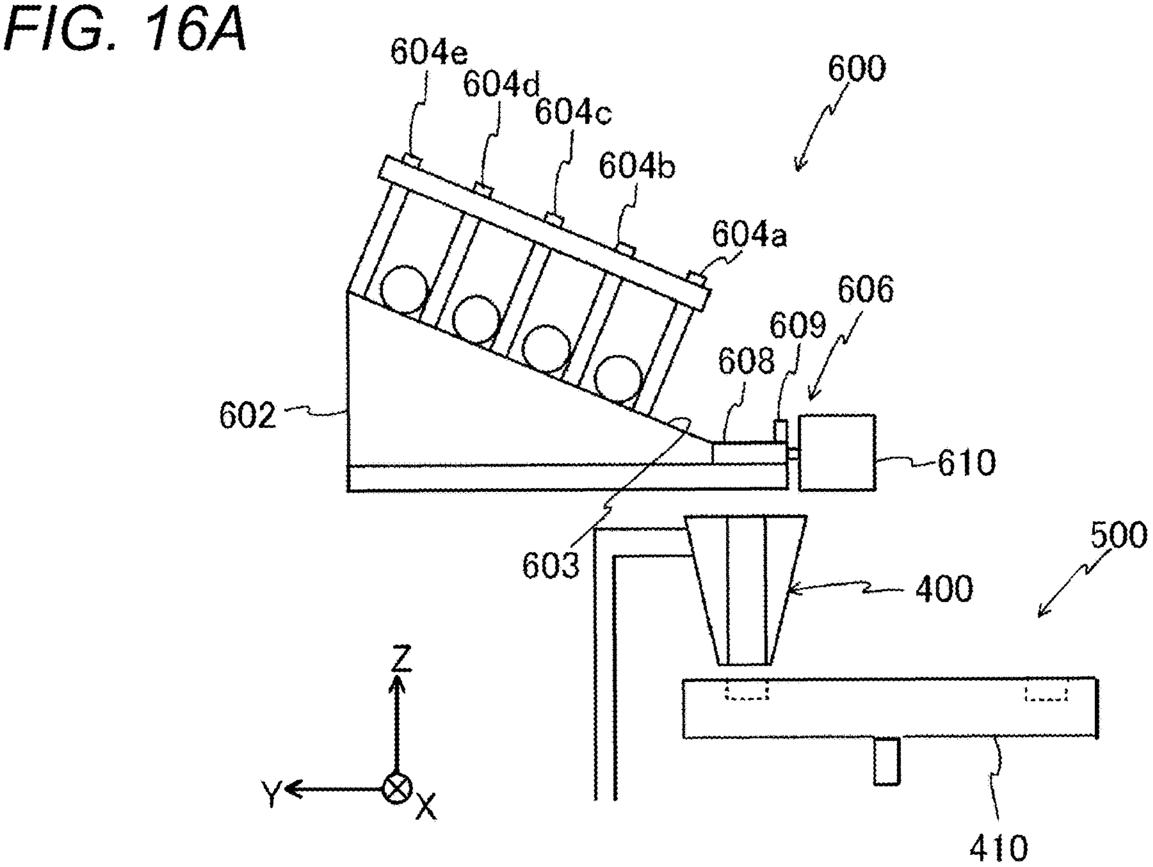
FIGS. 16A and 16B are diagrams for explaining a supply platform according to Modification 2.
Figure 16B:
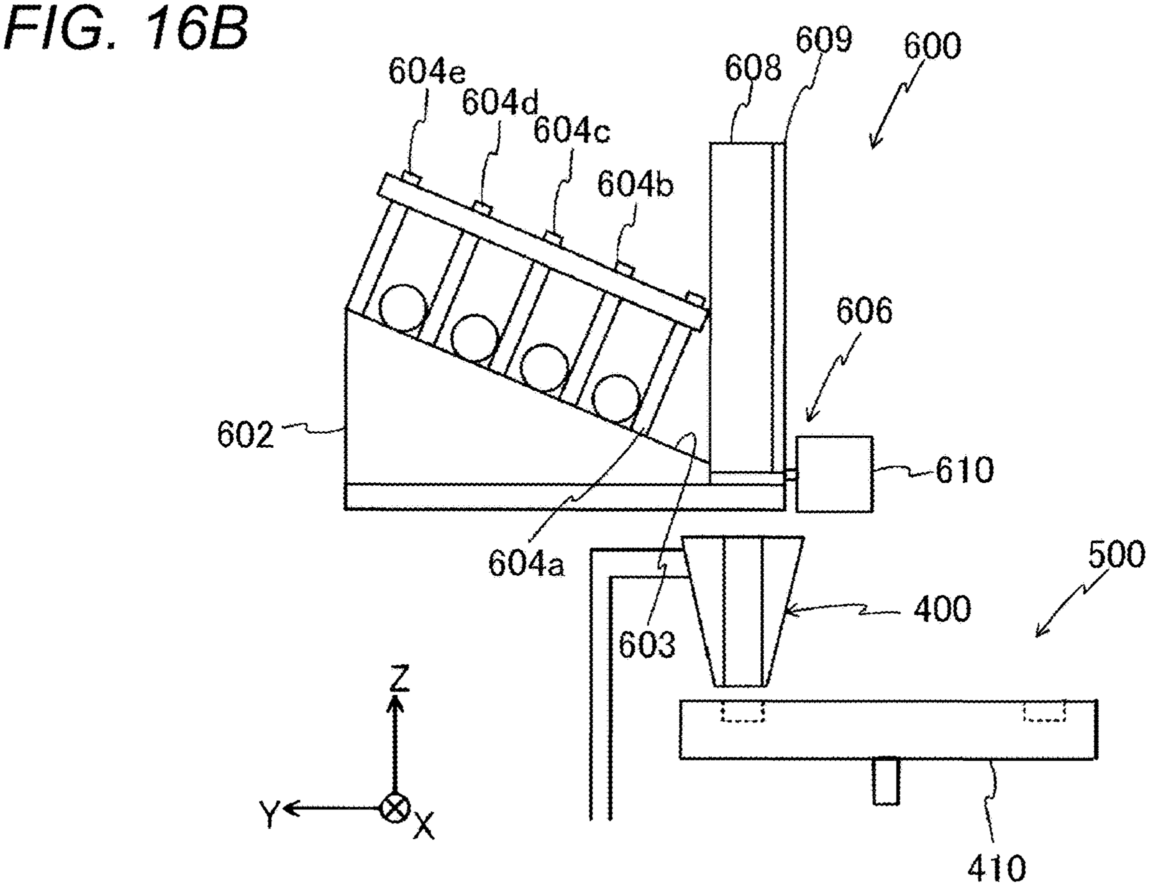

FIGS. 16A and 16B schematically illustrate a configuration of the supply platform 600. Note that it is assumed that the supply platform 600 is installed on the main body unit 104.

As illustrated in FIGS. 16A and 16B, the supply platform 600 includes an inclined platform 602 having an inclined surface 603, a first gate 604*a*, a second gate 604*b*, a third gate 604*c*, a fourth gate 604*d*, and a fifth gate 604*e* provided on the inclined surface 603, and a pile erecting device 606 as a supply mechanism.

The piles 200 can be placed in (e.g., prepared) beforehand between each of the gates 604*a* to 604*e*. Note that each of the gates 604*a* to 604*e* can be moved in a direction vertical to the inclined surface 603 by a drive device (not illustrated). This movement opens or closes each of the gates 604*a* to 604*e*.

The pile erecting device 606 includes a drive device 610, a planar member 608, and a stopper 609. The longitudinal direction of the planar member 608 coincides with the X-axis direction in the state in FIG. 16A. The planar member 608 is put into the state in FIG. 16B (e.g., a raised state) by the drive device 610 rotating a rotary shaft provided at an end portion of the planar member 608 on the −X side about the Y-axis.

Figure 17A:
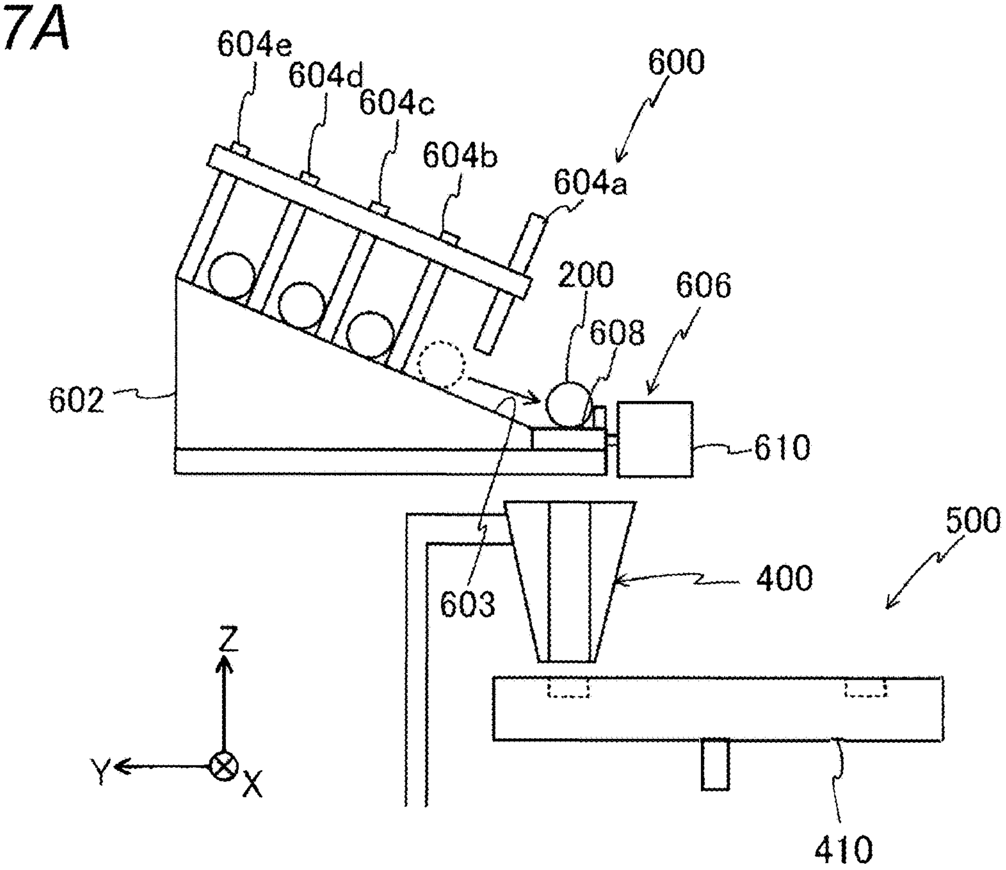
FIGS. 17A and 17B are diagrams for explaining a method for supplying a pile to a transfer mechanism using the supply platform according to Modification 2.

In Modification 2, when the pile 200 is transferred to the transfer mechanism 500 from the supply platform 600, first, the first gate 604*a* is opened as illustrated in FIG. 17A. Opening the first gate 604*a* causes the pile 200 held by the first gate 604*a* to roll along the inclined surface 603 and move onto the planar member 608. At this time, the pile 200 is retained on the planar member 608 by the stopper 609. Note that the pile 200 may be retained on the planar member 608 by forming an upper surface of the planar member 608 into a recessed shape. In these circumstances, the stopper 609 may be omitted.

Figure 17B:
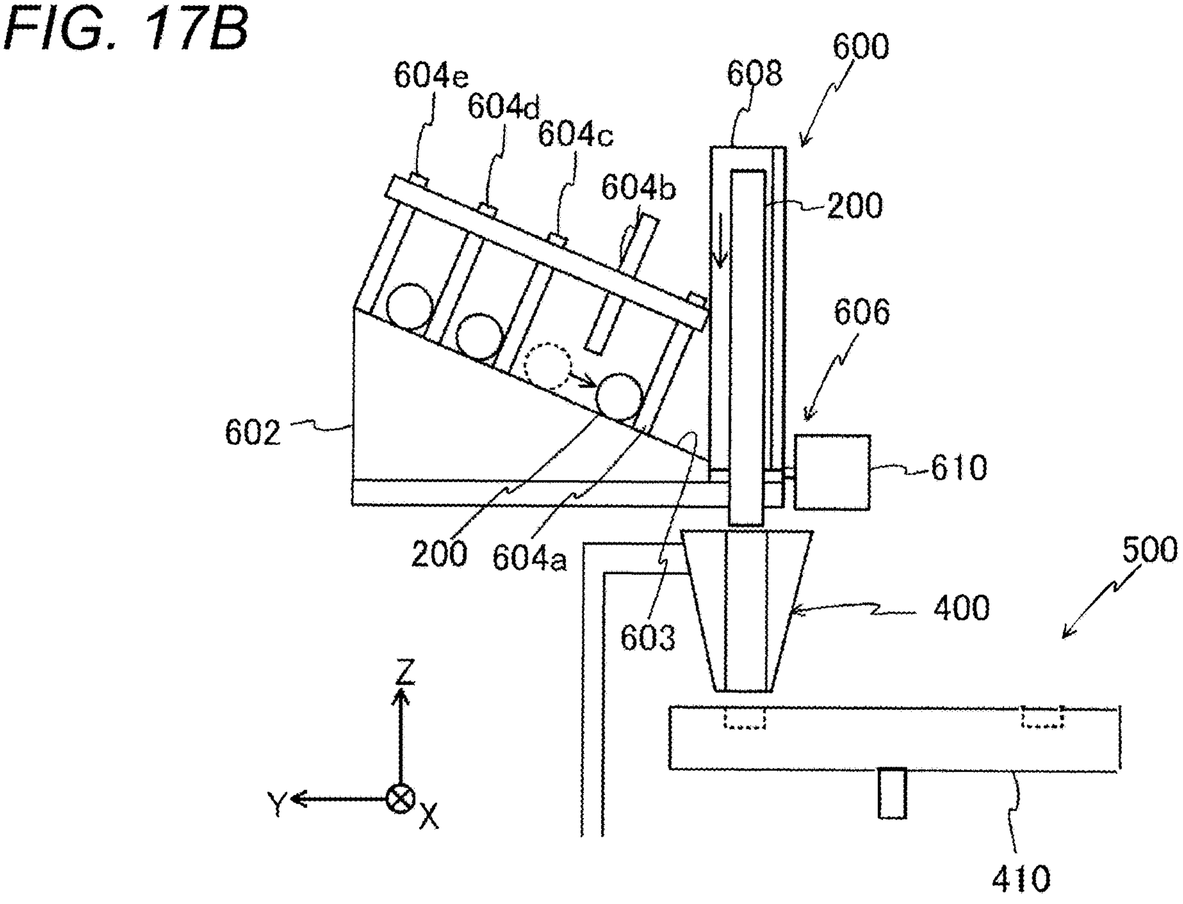

The drive device 610 rotates the rotary shaft from this state to raise the planar member 608 as illustrated in FIG. 17B. This causes the pile 200 on the planar member 608 to slide along the upper surface of the planar member 608 and enter the tapered container 400 from above. Then, similar to above Modification 1, the pile 200 is held in a recess of the supplier 410. The subsequent operation of the supplier 410 is similar to that in Modification 1 described above.

Meanwhile, the first gate 604*a* returns to a closed state as illustrated in FIG. 17B from an open state as in FIG. 17A. By opening the second gate 604*b* from this state, as illustrated in FIG. 17B, the pile 200 held by the second gate 604*b* rolls on the inclined surface 603 and is held by the first gate 604*a*. Thereafter, by performing an operation of closing the second gate 604*b* and opening the third gate 604*c* and an operation of closing the third gate 604*c* and opening the fourth gate 604*d*, each pile 200 is moved downward in stages.

As described above, in Modification 2, the four piles 200 held on the inclined platform 602 can be sequentially supplied to the transfer mechanism 500 without using the robot arm 10.

Note that, in FIG. 16A and the like, a case where the number of gates is five has been described, but the number of gates is not limited thereto and can be increased or decreased, as necessary.

As described above, according to Modification 2, the inclined platform 602 sequentially supplies the piles to the pile erecting device 606 along the inclined surface 603, and the pile erecting device 606 supplies the supplied pile to the transfer mechanism 500 while raising (i.e., erecting) the pile. This allows the pile 200 to be supplied to the transfer mechanism 500 with a simple configuration without using the robot arm 10.

Note that, in above Modification 2, the robot arm 10 may be provided in the main body unit 104 together with the supply platform 600, and a large number of piles 200 may be loaded on the main body unit 104. In these circumstances, the piles 200 loaded on the main body unit 104 may be supplied to the supply platform 600 as appropriate using the robot arm 10.

The embodiments described above are merely examples for describing the present invention, and various changes can be made without departing from the scope of the present invention. For example, instead of providing the GNSS 54 and the imaging device 56 in the main body unit 104 at a low position, a pole member may be provided in the main body unit 104, and at least one of the GNSS 54 or the imaging device 56 may be provided on the pole member. In particular, with the GNSS 54 provided on the pole member, it is easier to measure the location compared to when the GNSS 54 is provided in the main body unit 104 at a low position.

The following is a list of reference signs used in this specification and in the drawings.

10 Robot arm
12 Arm unit
14 Swing unit
16 Hand unit
17 Suction unit
19 Gripping unit
20 Pile driver
22 Sliding unit
24 Gimbal
26 Wire wind-up unit
27 Wire
28 Vibratory hammer
29 Chuck mechanism
30 Moving device
32 Driving link
33 Rotary shaft
34 Driven link
36 Intermediate link
38 Rotary drive device
50 Control device
52 Communication device
54 Global navigation satellite system
56 Imaging device
58 Memory
100 Piling machine
102 Traveling device
104 Main body unit
106 Drive source
200 Pile
300 Piling machine
320 Pile driver
322 Table
324 Hydraulic jack
326 Gripping mechanism
330 Sliding mechanism
332 Stator
334 Mover
340 Actuator
400 Tapered container
402 Notch
410 Supplier
412 Recess
414 Recess
420 Rotary shaft
500 Transfer mechanism
600 Supply platform
602 Inclined platform
603 Inclined surface
604 Gate
606 Pile erecting device
608 Planar member
609 Stopper
610 Drive device

The invention claimed is:

1. A piling machine, comprising:

a main body unit including a traveling device that travels in a first direction on a ground; wherein the traveling device moves the main body unit in the first direction;
a pile driver that performs piling into the ground;
a moving device that is connected to the main body unit and the pile driver, wherein the moving device moves the pile driver in a second direction that opposes the first direction so as to offset movement of the main body unit in the first direction; and
a control device that, while the traveling device is traveling in the first direction, controls the moving device so that a position of the pile driver relative to the ground is kept unmoved, and that causes the pile driver to perform the piling and thereby drive a pile while the traveling device moves the main body unit.

2. The piling machine according to claim 1, wherein, while the pile driver performs the piling, the control device controls the moving device such that a speed at which the traveling device moves in the first direction is equal to a speed at which the moving device moves in the second direction.

3. The piling machine according to claim 1, wherein the control device controls the moving device such that a speed at which the main body unit moves in the second direction is determined based on at least one of a distance between two piles to be consecutively driven by the pile driver, a driving length of the piles, or a pile driving speed of the pile driver.

4. The piling machine according to claim 3, wherein the control device determines the speed at which the main body unit moves in the second direction based on a time until the pile driver returns to an initial position after performing the piling while moving in the first direction from the initial position and a time until a next pile is set in the pile driver that has returned to the initial position.

5. The piling machine according to claim 1, wherein the moving device is a linkage mechanism including a mechanism that converts a rotational motion into a linear motion.

6. The piling machine according to claim 1, wherein the moving device is a sliding mechanism that linearly moves the pile driver with respect to the main body unit.

7. The piling machine according to claim 6, wherein the pile driver is provided on a table configured to change an attitude with respect to the sliding mechanism using an actuator.

8. The piling machine according to claim 1, wherein the pile driver includes a maintenance mechanism that maintains perpendicularity of the pile driver.

9. The piling machine according to claim 1, comprising:
a detection device that detects a state of a pile driven by the pile driver; and
an adjustment device that adjusts a way of driving a pile to be driven, based on a detection result of the detection device.

10. The piling machine according to claim 1, comprising:
a detection device that detects a state of a pile driven by the pile driver; and
a display device that displays information regarding correction of the pile driven by the pile driver, based on a detection result of the detection device.

11. The piling machine according to claim 1, wherein the main body unit includes a suction unit that sucks a pile, a gripping unit that grips the pile, and a first supply device that supplies the pile to the pile driver.

12. The piling machine according to claim 1, comprising:
a holding unit that holds a pile in an upright state, the holding unit being movable between a first position and a second position, wherein the holding unit receives supply of the pile in the upright state when located at the first position, and supplies the pile held by the holding unit to the pile driver when located at the second position.

13. The piling machine according to claim 12, comprising:
an inclined platform that sequentially supplies the pile to a vicinity of the first position along an inclined surface; and
a supply mechanism that supplies the pile supplied to the vicinity of the first position to the holding unit while raising the pile to the upright state.

14. The piling machine according to claim 2, wherein the control device determines the speed at which the main body unit moves in the second direction based on at least one of a distance between two piles to be consecutively driven by the pile driver, a driving length of the piles, or a pile driving speed of the pile driver.

15. The piling machine according to claim 1, wherein the control device does not stop the traveling device while the piling is being performed.

16. The piling machine according to claim 14, wherein the control device is configured to move the traveling device in a first direction at a constant speed.

17. A method of piling, comprising:
moving a main body in a first direction with a traveling device that travels in the first direction on a ground;
moving a pile driver that performs piling into the ground, wherein a moving device is connected to the main body and the pile driver, and wherein the moving device moves the pile driver in a second direction that opposes the first direction so as to offset movement of the main body in the first direction; and
driving a pile by the pile driver while the traveling device moves the main body in the first direction, wherein the pile driver is moved by the moving device so that a position of the pile driver relative to the ground is kept unmoved, wherein a control device controls the moving device while the traveling device is traveling in the first direction to perform the piling.

18. The method of piling according to claim 17, wherein driving the pile by the pile driver does not stop movement of the main body in the first direction while the pile is being driven.

19. The method of piling according to claim 17, wherein the main body moves in the first direction at a constant speed.

20. The method of piling according to claim 17, wherein, while the pile driver performs the piling, a speed at which the main body moves in the first direction is equal to a speed at which the pile driver moves in the second direction.

* * * * *